US009764316B2

(12) United States Patent
Kharlampieva et al.

(10) Patent No.: US 9,764,316 B2
(45) Date of Patent: Sep. 19, 2017

(54) BIODEGRADABLE PHOTOCATALYTIC NANOCOMPOSITE MICROSPONGES OF POLYACTIC ACID

(75) Inventors: Eugenia P. Kharlampieva, Birmingham, AL (US); Benjamin Yancey, Hoover, AL (US)

(73) Assignee: The UAB Research Foundation, Birmingham, AL (US)

( * ) Notice: Subject to any disclaimer, the term of this patent is extended or adjusted under 35 U.S.C. 154(b) by 859 days.

(21) Appl. No.: 14/125,371

(22) PCT Filed: Jun. 18, 2012

(86) PCT No.: PCT/US2012/042880
§ 371 (c)(1),
(2), (4) Date: Dec. 11, 2013

(87) PCT Pub. No.: WO2012/177535
PCT Pub. Date: Dec. 27, 2012

(65) Prior Publication Data
US 2014/0102991 A1    Apr. 17, 2014

Related U.S. Application Data

(60) Provisional application No. 61/498,531, filed on Jun. 18, 2011.

(51) Int. Cl.
*C02F 1/30* (2006.01)
*C02F 1/72* (2006.01)
(Continued)

(52) U.S. Cl.
CPC ............ *B01J 31/38* (2013.01); *B01J 21/063* (2013.01); *B01J 35/002* (2013.01); *B01J 35/004* (2013.01);
(Continued)

(58) Field of Classification Search
None
See application file for complete search history.

(56) References Cited

U.S. PATENT DOCUMENTS 5,981,568 A * 11/1999 Kunz ................... A61K 31/337
514/319
2002/0010097 A1* 1/2002 Linkous ................ A01N 59/16
504/120
(Continued)

OTHER PUBLICATIONS

The International Search Report and Written Opinion dated Mar. 14, 2013.
(Continued)

*Primary Examiner* — Krishnan S Menon
*Assistant Examiner* — Bradley R Spies
(74) *Attorney, Agent, or Firm* — Thomas | Horstemeyer, LLP

(57) ABSTRACT

Despite significant progress in the synthesis of nanocomposite materials, integration of several components with various functions remains a big challenge, which significantly limits control over nanocomposite properties. The disclosure provides a multifunctional micro particle based on incorporation of titania nanoparticles combined into a porous polylactic acid (PLA) matrix. PLA is used as a biodegradable and biocompatible polymer and titania nanoparticles represent photocatalytically active nanofillers capable of degradation of organic compounds under solar irradiation. Titania nanoparticles are integrated with PLA by using 'mixed' and 'in situ grown' approaches. The hybrid systems effectively absorbed and degraded organic impurities from water. The sorption capacity, dye degradability, and PLA disintegration were controlled by varying the concentration of incorporated titania. The hybrid degradable
(Continued)

systems can be applied as novel non-toxic photocatalytic materials for such as environmental cleanup of contaminated waters.

9 Claims, 15 Drawing Sheets

(51) Int. Cl.
| | |
|---|---|
| B01J 31/38 | (2006.01) |
| C01G 23/047 | (2006.01) |
| C02F 1/32 | (2006.01) |
| C08L 67/04 | (2006.01) |
| C09C 1/36 | (2006.01) |
| B01J 35/00 | (2006.01) |
| B01J 37/02 | (2006.01) |
| B01J 37/03 | (2006.01) |
| B01J 21/06 | (2006.01) |
| B01J 35/02 | (2006.01) |
| B01J 37/00 | (2006.01) |
| B01J 35/08 | (2006.01) |
| B01J 35/10 | (2006.01) |

(52) U.S. Cl.
CPC ........... *B01J 35/023* (2013.01); *B01J 37/009* (2013.01); *B01J 37/0203* (2013.01); *B01J 37/0209* (2013.01); *B01J 37/0236* (2013.01); *B01J 37/033* (2013.01); *C01G 23/047* (2013.01); *C02F 1/32* (2013.01); *C02F 1/725* (2013.01); *C08L 67/04* (2013.01); *C09C 1/3676* (2013.01); *C01P 2002/72* (2013.01); *C01P 2002/82* (2013.01); *C01P 2002/85* (2013.01); *C01P 2004/03* (2013.01); *C01P 2004/61* (2013.01); *Y10T 428/2982* (2015.01)

(56) References Cited

U.S. PATENT DOCUMENTS

| | | | |
|---|---|---|---|
| 2005/0151296 A1* | 7/2005 | Obuchi | B32B 27/10 264/171.13 |
| 2005/0226904 A1 | 10/2005 | Choi et al. | |
| 2009/0098288 A1 | 4/2009 | Massa et al. | |
| 2010/0264097 A1* | 10/2010 | Sun | A61K 9/0092 210/767 |
| 2010/0316854 A1 | 12/2010 | Gardner et al. | |

OTHER PUBLICATIONS

Liao, et al., "New Biodegradable Blends Prepared from Polylactide, Titanium Tetraisopropylate, and Starch," Journal of Applied Polymer Science, Feb. 2008, vol. 108, No. 4, pp. 2280-2289.

Sinha, "Polylactide-Based Bionanocomposites: A Promising Class of Hybrid Materials," Accounts of Chemical Research, Jan. 2012, vol. 45, No. 10, 99-1710.-1720.

\* cited by examiner

BIODEGRADABLE PHOTOCATALYTIC NANOCOMPOSITE MICROSPONGES OF POLYACTIC ACID

CROSS-REFERENCE TO RELATED APPLICATION(S)

This application is the 35 U.S.C. §371 national stage of PCT application PCT/US2012/042880, filed Jun. 18, 2012, which claims priority to and the benefit of U.S. Provisional Application Ser. No. 61/498,531, filed Jun. 18, 2011, both of which are hereby incorporated by reference herein in their entirety.

TECHNICAL FIELD

The present disclosure is generally related to photocatalytically active titanium dioxide and polylactic acid combined in a porous microparticle and to methods of synthesis thereof. The present disclosure further relates to methods of using the microparticles for the photodegradation of organic compounds in aqueous environments.

BACKGROUND

Poly(lactic acid) (PLA) is a widely used polymer derived from natural sources. PLA is a hydrophobic polymer that is completely insoluble in water. The hydrophobicity of PLA can be attenuated by copolymerization with other hydroxy-carboxylic acids such as glycolic acid and 4-hydroxybutyric acid (Amy et al., (2004) *J. Biomater. Sci. Polym. Edn.* 15: 1281-1304; Lu et al., (2000) *Biomater* 21: 1837-1845; *Biomaterials and Bioengineering Handbook*, ed. W. DL, Marcel Dekker, New York, pp. 141-155). The tunable hydrophobicity has previously been exploited in drug delivery applications, but it is also desirable for the absorption of organic pollutants (Wang et al., (2010) *J. Biomed. Mat. Res., Part B, Appl. Biomater.* 93, 84-92; Liu et al., (2006) *J. Biomed. Mat. Res.*, 78A: 798-807; Liu et al., (2005) *Nanotechnology* 16: S601-S608; Liu et al., (2006) *Int. J. Nanomed.* 1: 541-545). PLA has been considered suitable for these purposes because of its biocompatibility, tunable biodegradation and controlled hydrophobicity (Yanling et al., (2005) *J Macromol Sci C Polym Rev.* 45: 325-349; Hiltunen & Harkonen, (1997) *Macromol.* 30: 373-379), and make PLA ideal as an environmentally-acceptable sorbent material.

Titania (titanium dioxide, $TiO_2$) is a biocompatible metal oxide commonly used for anti-fouling, anti-microbial, and UV-absorbing properties. Titania has well known photocatalytic properties. It can be used to degrade most organic chemicals to $CO_2$ and water. The photocatalytic properties of titania have thus far only been observed in the anatase and rutile crystalline forms but not the amorphous phase (Zhang, (2009) *Coord. Chem. Rev.* 253: 315-3041; C. C. Sorrell, (2011) *J. Mater. Sci.* 46: 855-874). There have been many methods developed to form anatase phase or rutile phase titania. All of these methods require harsh conditions such as strong acids or bases or high temperatures which are not compatible with polymeric systems, precluding combining photocatalytically active TiO2 and heat-sensitive organic polymers in a single structure (Ismagilov et al., (2009) *Rus. Chem. Rev.* 78: 873-885; Wu et al., (2009) *Eur. J. Inorg. Chem.* 2009: 2789-2795; Xin, (2010) *Appl. Mater. Inter.* 2: 3479-3485; Kalita (2006) *Mater. Sci. and Eng. A.* 435-436: 327-332). Recently, however, methanol has been shown to induce the mineralization of titania into a photocatalytically active mixture of anatase and amorphous phases at low temperature and without the use of acids or bases.

There have been efforts to incorporate titania into polymer systems to utilize the desirable properties of both constituents. Such combination materials are multifunctional, being able to absorb and degrade organics, be biodegradable, and are biocompatible (environmentally benign). Because of these uses, PLA based composites have mostly been used as protective coatings.

There been few reports on PLA/titania systems prepared in situ under relatively mild conditions. All previous studies have been focused on incorporating pre-prepared titania into a polymer matrix. A variety of different approaches have been used to create mixed-hybrid PLA/titania systems such as mixed composites (Zhu et al., (2011) *Polym Composite* 32: 519-528), grafted to polymers (Luo et al., (2009) *Acta Materials* 57: 3182-3191), and by modifying $TiO_2$ for dispersal in composite systems (Norio Nakayama, (2007) *Polym Deg Stab* 92: 1255-1264).

Most of the work on developing $PLA/TiO_2$ composite systems has been for the purpose of bioengineering bone grafts. The $PLA/TiO_2$ systems have better performance than the previously studied PLA/hydroxyapatite systems. The $TiO_2$ reduces the acidity of the bone graft as the PLA degrades into lactic acid, and also increases the overall degradation rate. Thin films, microspheres and microfoams have been employed for this purpose. The only studies on $PLA/TiO_2$'s photocatalytic properties have focused on thin films for applications such as antifouling coatings. All of these systems were also composite systems and had issues related to inconsistent mixing, while most also exhibited a lag time associated with mass transfer limitations of hydroxyl radicals out of the PLA matrix. This lag time was eliminated by exposing the films to UV irradiation before exposing the films to a test dye solution.

SUMMARY

The disclosure provides a multifunctional microparticle based on incorporation of titania nanoparticles combined into a porous polylactic acid (PLA) matrix. One aspect of the present disclosure, therefore, provides embodiments of a hybrid microparticle comprising photocatalytically active titanium dioxide and a poly-(D,L-lactic acid) polymer, where the microparticle comprises a plurality of pores.

In embodiments of this aspect of the disclosure, the titanium dioxide can be embedded in a polymer comprising poly-(D,L-lactic acid).

In embodiments of this aspect of the disclosure, the titanium dioxide can comprise anatase titanium dioxide nanoparticles coated in a polymer comprising poly-(D,L-lactic acid).

In embodiments of this aspect of the disclosure, the hybrid micro particle has at least one dimension in the range of about 50 µm to about 400 µm.

In embodiments of this aspect of the disclosure, the hybrid microparticle can have at least one dimension in the range of about 100 µm to about 300 µm.

In embodiments of this aspect of the disclosure, the microparticle on contacting an organic compound and irradiated with light energy can degrade the organic compound.

In embodiments of this aspect of the disclosure, the microparticle can be degradable on prolonged irradiation by light energy.

Another aspect of the present disclosure encompasses embodiments of a method of photocatalytically degrading an organic compound in an aqueous liquid comprising: (i)

adding hybrid microparticles according to the disclosure to an aqueous liquid having an organic compound desired to be degraded; and (ii) irradiating the hybrid microparticles with light energy, thereby photocatalytically degrading an organic compound in contact with the titanium dioxide of the hybrid microparticles.

In embodiments of this aspect of the disclosure, the organic compound can be, but is not limited to, a hydrocarbon, a biomolecule, an industrial waste product, or an agricultural waste product.

In embodiments of this aspect of the disclosure, the method can further comprise the step of allowing the hybrid microparticles to degrade.

Another aspect of the present disclosure encompasses embodiments of a method for generating photocatalytically capable porous hybrid microparticles comprising the steps of: combining in an organic solvent a poly-(D,L-lactic acid) or a poly-(lactic-co-glycolic acid), and a titanium oxide; (ii) adding 2-methylpentane to form a polylactide:titanium oxide: 2-methylpentane mixture; (iii) adding the polylactide: titanium oxide: 2-methylpentane mixture to a solution of polyvinyl alcohol (PVA) thereby forming an emulsion; (iv) allowing the organic solvents to evaporate, thereby forming microparticles; (v) isolating the microparticles; (vi) contacting the isolated microparticles with methanol, thereby generating porous photocatalytically capable microparticles; and (vii) isolating the photocatalytically capable porous hybrid microparticles from the methanol.

In embodiments of this aspect of the titanium oxide is combined with poly-(D,L-lactic acid).

In embodiments of this aspect of the disclosure, the titanium oxide can be titanium tetraisopropoxide (TTIP) or anatase titanium dioxide.

In embodiments of this aspect of the disclosure, the titanium oxide can be titanium tetraisopropoxide and forms covalent bonds with the poly-(D,L-lactic acid).

In embodiments of this aspect of the disclosure, the organic solvent can be chloroform or dichloromethane.

In embodiments of this aspect of the disclosure, the organic sol vent can be dichloromethane and the ratio of dichloromethane to the poly-(D,L-lactic acid):titanium oxide: 2-methylpentane mixture can be between about 13:1 to about 18:1.

In embodiments of this aspect of the disclosure, the ratio of poly-(D,L-lactic acid)+titanium oxide: 2-methylpentane can be from about 10:0 to about 3:2.

In embodiments of this aspect of the disclosure, the ratio of poly-(D,L-lactic acid)+titanium oxide: 2-methylpentane can be about 3:2.

In embodiments of this aspect of the disclosure, the photocatalytically capable microparticle can have between about 10% titanium dioxide to about 30% titanium dioxide.

In embodiments of this aspect of the disclosure, the photocatalytically capable microparticle can have about 10% titanium dioxide or about 20% titanium dioxide.

BRIEF DESCRIPTION OF THE DRAWINGS

Further aspects of the present disclosure will be more readily appreciated upon review of the detailed description of its various embodiments, described below, when taken in conjunction with the accompanying drawings.

Figure 1A:
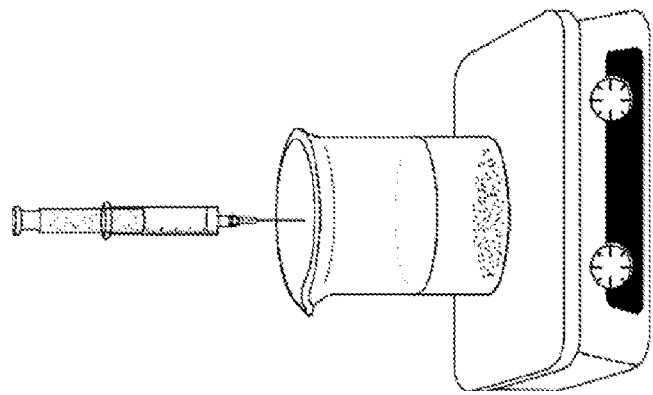
FIGS. 1A and 1B schematically illustrate the formation of titania/PLA hybrid microparticles and the methanol mineralization steps to generate the photocatalytically active $TiO_2$ of the disclosure.
Figure 1A:
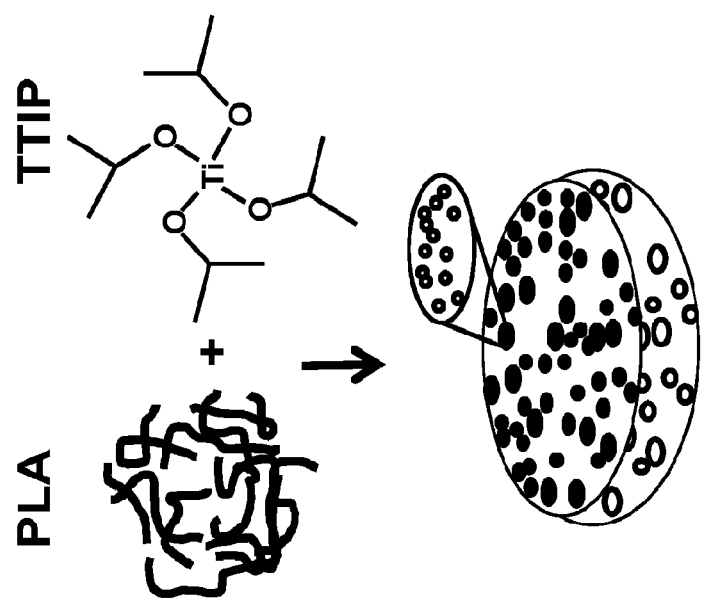
Figure 1A:
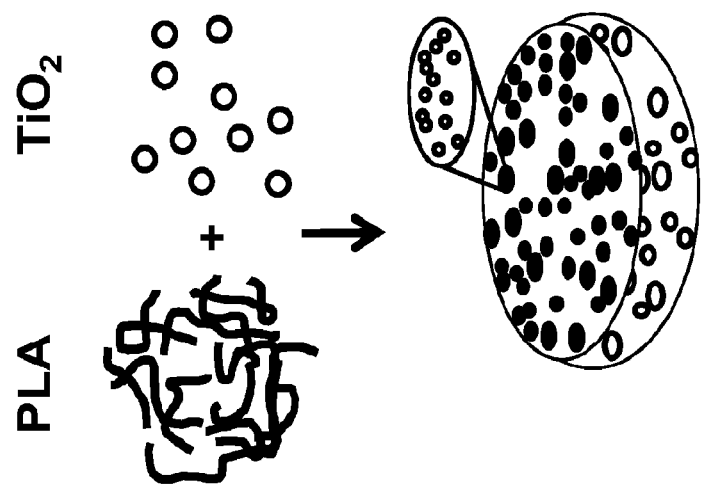
Figure 1B:
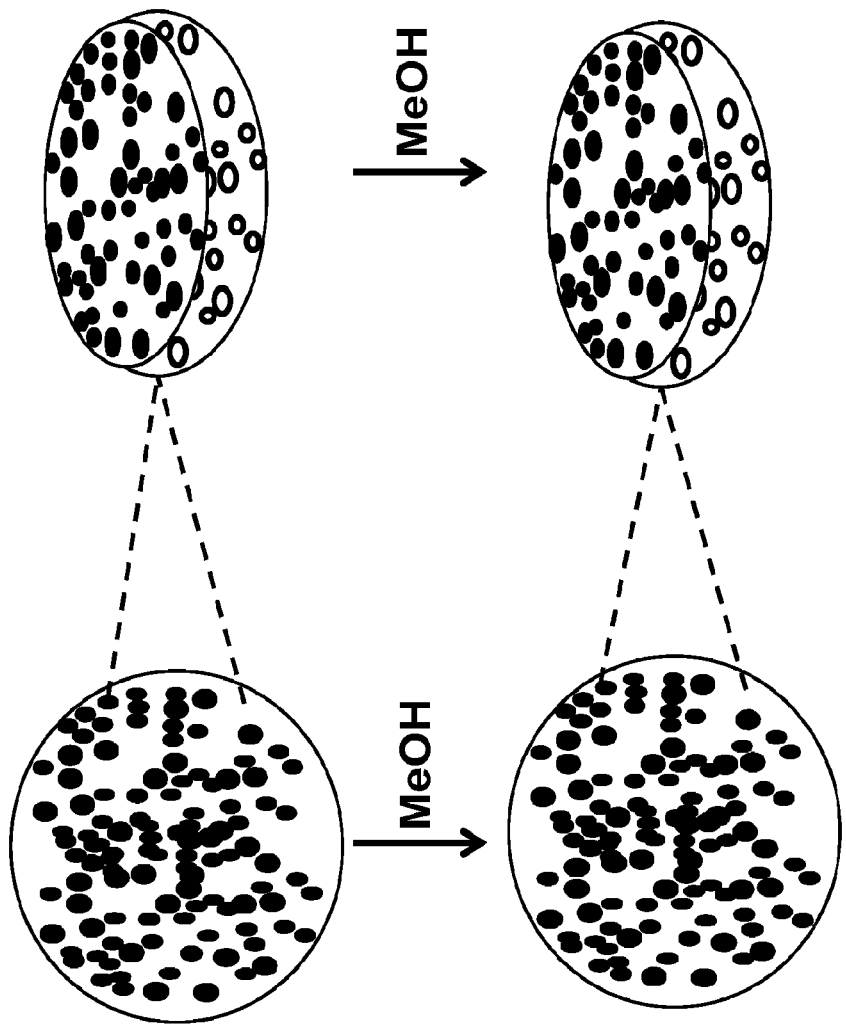

The drawings are described in greater detail in the description and examples below.

The details of some exemplary embodiments of the methods and systems of the present disclosure are set forth in the description below. Other features, objects, and advantages of the disclosure will be apparent to one of skill in the art upon examination of the following description, drawings, examples and claims. It is intended that all such additional systems, methods, features, and advantages be included within this description, be within the scope of the present disclosure, and be protected by the accompanying claims.

DETAILED DESCRIPTION

Before the present disclosure is described in greater detail, it is to be understood that this disclosure is not limited to particular embodiments described, and as such may, of course, vary. It is also to be understood that the terminology used herein is for the purpose of describing particular embodiments only, and is not intended to be limiting, since the scope of the present disclosure will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range, is encompassed within the disclosure. The upper and lower limits of these smaller ranges may independently be included in the smaller ranges and are also encompassed within the disclosure, subject to any specifically excluded limit in the stated range. Where the stated range includes one or both of the limits, ranges excluding either or both of those included limits are also included in the disclosure.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, the preferred methods and materials are now described.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present disclosure is not entitled to antedate such publication by virtue of prior disclosure. Further, the dates of publication provided could be different from the actual publication dates that may need to be independently confirmed.

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosure. Any recited method can be carried out in the order of events recited or in any other order that is logically possible.

Embodiments of the present disclosure will employ, unless otherwise indicated, techniques of medicine, organic chemistry, biochemistry, molecular biology, pharmacology, and the like, which are within the skill of the art. Such techniques are explained fully in the literature.

It must be noted that, as used in the specification and the appended claims, the singular forms "a," "an," and "the" include plural referents unless the context clearly dictates otherwise. Thus, for example, reference to "a support" includes a plurality of supports. In this specification and in the claims that follow, reference will be made to a number of terms that shall be defined to have the following meanings unless a contrary intention is apparent.

As used herein, the following terms have the meanings ascribed to them unless specified otherwise. In this disclosure, "comprises," "comprising," "containing" and "having" and the like can have the meaning ascribed to them in U.S. Patent law and can mean "includes," "including," and the like; "consisting essentially of" or "consists essentially" or the like, when applied to methods and compositions encompassed by the present disclosure refers to compositions like those disclosed herein, but which may contain additional structural groups, composition components or method steps (or analogs or derivatives thereof as discussed above). Such additional structural groups, composition components or method steps, etc., however, do not materially affect the basic and novel characteristic(s) of the compositions or methods, compared to those of the corresponding compositions or methods disclosed herein. "Consisting essentially of" or "consists essentially" or the like, when applied to methods and compositions encompassed by the present disclosure have the meaning ascribed in U.S. Patent law and the term is open-ended, allowing for the presence of more than that which is recited so long as basic or novel characteristics of that which is recited is not changed by the presence of more than that which is recited, but excludes prior art embodiments.

Abbreviations

TIPP: titanium tetraisopropoxide; DCM: dichloromethane; PVA: polyvinyl alcohol (MW=72,000), 2MP: 2-methylpentane; PLA: poly-(D,L-lactic acid) (PLA $M_n$=136,000); EDX: Energy-dispersive X-ray spectroscopy; XPS: X-ray photoelectron spectroscopy.

Definitions

The term 'mixed composite' as used herein refers to PLA/$TiO_2$ microparticles obtained by direct mixing of titania nanoparticles with PLA matrix The term 'in situ hybrid macroparticle' as used herein refers to PLA/$TiO_2$ microparticles obtained by in situ mineralization of titania nanoparticles (using titania precursor such as TIPP) within PLA matrix.

The term "hybrid microparticle" as used herein refers to a particle between about 50 μm and about 400 μm, preferably between about 10 μm and about 300 μm and comprising a titanium dioxide and a polymer formed from poly-(D,L-lactic acid).

The term "photocatalytically active" as used herein refers to a substance that shows catalytic activity when irradiated with light such as ultraviolet rays, and preferably, to a substance that, when irradiated with light, can decompose and eliminate various organic and inorganic compounds and perform sterilization.

The term "anatase" as used herein refers to one of the three mineral forms of titanium dioxide. Crystals of anatase can be prepared in laboratories by chemical methods such as sol-gel method. Examples include controlled hydrolysis of titanium tetrachloride ($TiCl_4$) or titanium alkoxides.

The term "sol-gel" as used herein refers to a wet-chemical technique used primarily for the fabrication of metal oxides) starting from a colloidal solution (sol) that acts as the precursor for an integrated network (or gel) of either discrete particles or network polymers. Typical precursors are metal alkoxides and metal salts (such as chlorides, nitrates and acetates), which undergo various forms of hydrolysis and polycondensation reactions.

The term "organic compound" as used herein refers to any organic molecule that can pass through the pores of the hybrid microparticles of the disclosure. Such compounds include, but are not limited to, such as hydrocarbons, alkyl and aromatic that are derived from or found in crude oil, antibiotics, pharmaceuticals, hormones, the products of industrial and agricultural processes, and the like that are suspended or dissolved in an aqueous fluid, including naturally occurring bodies of water, marine and freshwater, lakes, rivers, estuaries, lagoons, and the like. Accordingly, the microparticles of the present disclosure are advantageous for the degradation of organic compounds considered to be pollutants of aqueous bodies. The microparticles of the disclosure are suitable for degrading organic compounds photocatalytically and may then be degraded themselves to leave a residual titanium dioxide that is environmentally benign.

The term "coated" as used herein refers to an encapsulating layer of a polymer surrounding partially or entirely a core body.

The term "titanium oxide" as used herein refers to any form titanium oxide that can function as a photocatalyst for the degradation of organic molecules. The term also refers to any precursor oxide that can be converted to a photocatalytically capable form thereof by the methods of the present disclosure. For example, but not intended to be limiting, titanium tetraisopropoxide (TTIP), an alkyloxide, may be used to generate a titanium dioxide form cross-linked to a polymer formed from poly-(D,L-lactic acid). In the methods of the disclosure, displacement of the isopropionyl groups during the formation of titanium dioxide (titania) leads to the formation of isopropanol, thereby giving rise to the "sponge-like" porous structure of the hybrid microparticles of the disclosure.

The term "poly-(D,L-lactic acid)" (PLA) as used herein refers to $(C_3H_4O_2)_n$ Poly(lactic acid) or polylactide (PLA), a thermoplastic aliphatic polyester. PLA is not a polyacid (polyelectrolyte), but rather a polyester. Two lactic acid molecules undergo a single esterification and then catalytically cyclize to form a cyclic lactide ester. PLA of high molecular weight is produced from the dilactate ester by ring-opening polymerization using stannous catalyst. It is understood that several distinct forms of polylactide may be used in the compositions of the disclosure including, but not limited to, poly-L-lactide (PLLA) resulting from polymerization of L,L-lattice (also known as L-lactide), PDLA (poly-D-lactide), and poly(L-lactide-co-D,L-lactide) (PLDLLA).

Also contemplated to be useful in the formation of the microparticles of the disclosure is a poly(lactic-co-glycolic acid) copolymers (PLGA) alone or in combination with a PLA-derivative. PLGA or poly(lactic-co-glycolic acid) is a copolymer synthesized by means of random ring-opening co-polymerization of two different monomers, the cyclic dimers (1,4-dioxane-2,5-diones) of glycolic acid and lactic acid. Common catalysts used in the preparation of this polymer include tin(II) 2-ethylhexanoate, tin(II) alkoxides, or aluminum isopropoxide. During polymerization, successive monomeric units (of glycolic or lactic acid) are linked together in PLGA by ester linkages, thus yielding a linear, aliphatic polyester as a product. Depending on the ratio of lactide to glycolide used for the polymerization, different forms of PLGA can be obtained, such as, but not limited to PLGA 75:25, a copolymer whose composition is 75% lactic acid and 25% glycolic acid). Unlike the homopolymer of lactic acid (polylactide) (PLA) which has poor solubility, PLGA can be dissolved by a wide range of common solvents, including chlorinated solvents, tetrahydrofuran, acetone or ethyl acetate.

Description

The present disclosure provides for novel multi-functional hybrid titania/PLA microparticles. Two methods were found to be suitable for the generation of the multifunctional hybrid particles of the disclosure. In the first approach, the organic and inorganic materials can be combined and cast into microspheres using an oil-water emulsion. In the second approach there is covalent attachment of the inorganic component to the organic fraction of the material in situ via an acid-catalyzed sol-gel condensation. The in situ PLA/TiO$_2$ can then cast into microspheres. The TiO$_2$ formed by these procedures is amorphous so methanol mineralization was applied to produce the photocatalytically active materials.

The microparticles of the present disclosure, because of their porous structure have the ability to absorb organic compounds that can then contact the photocatalytically active titania. Upon exposure to light, and in particular solar ultraviolet irradiation, the titania photoactivated reactions to convert the organic molecules into such as carbon dioxide and other small organic moieties that can be less environmentally disadvantageous compared to the organic compounds in their original state before contact with the microparticles.

Accordingly, the microparticles of the present disclosure are particularly suitable for depositing into bodies of water that contain organic compound pollutants such as antibiotics, estrogens and derivatives thereof, crude oil-derived hydrocarbons, chemical and agricultural waste, and the like. Both during and after the microparticles have absorbed the organic compounds and subjected them to photocatalyzed degradation, the microparticles themselves are degraded so that ultimately all that remains is the insoluble form of the titania that can settle out of the water body. Titania itself is environmentally benign.

Titania Mineralization: Titania can be formed by various methods. One of the most common methods for titania formation is the solvo-thermal method. This method utilizes an acid catalyzed sol-gel condensation of the titanium tetraalkoxide precursor followed by a thermal crystallization with temperatures above 300° C. The sol-gel reaction alone produces amorphous titania that is photocatalytically inactive. The thermal crystallization step is necessary to obtain both the anatase and rutile crystalline forms of titania, both of which are photocatalytically active. The temperature used for crystallization determines the crystalline form of titania. In situ titania formation using the sol-gel method with TiO2 and PLA combined generated microparticles that were photocatalytically inactive and no crystalline titania could be detected. Significantly, using the heating conditions typically employed for the solvo-thermal method resulted in degradation of the polymer microparticles. This in situ formation followed by thermal treatment had been used previously to form titania nano and microparticles, but in all cases the polymer matrix was also destroyed by the thermal treatment (Cui et al., (2010) *J. Phys. Chem.* 114: 2434-2439; S. Wongnawa (2010) *J. Nanopart. Res.* 12: 2895-2906; Khalil et al., (2010) *J. Vinyl Addit. Tech.* 16: 272-276). The solvo-thermal method, therefore, was not suitable for the in situ formation of titania that is intended to remain in a polymer matrix. PLA degrades more quickly in the presence of acids or bases as well as being pyrolyzed at the temperatures required for titania mineralization.

Accordingly, a facile method to mineralize titania below 60° C. and without using concentrated strong acids or bases was developed for the preparation of the microparticles of the present disclosure. This method has previously been used for the preparation of titania in peptide and silafin networks, but not when in a polyester matrix. In the previously described methods, the peptide was designed to biomineralize titania, and the effects of methanol on the mineralization were not explored.

To explore the use of methanol as a mineralization agent, we performed a sol-gel synthesis of titania was explored by dissolving titania in isopropanol and then adding water dropwise until the formation of the white titania precipitate. The solution was then filtered, the white precipitate placed in a reaction vial, and covered with methanol. The titania was mineralized for varying amounts of time and at elevated temperatures. Anatase titania formed when exposed to methanol for 24 hrs at room temperature. Under all elevated temperatures and at shorter time periods, the titania remained amorphous.

In situ PLA/$TiO_2$: The in situ formation of titania was achieved using the carboxylic acid end group of the PLA polymer as a sol-gel catalyst for the solvolysis of titanium tetraisopropoxide in chloroform. The PLA/TiO2 in chloroform mixture was cast into microparticles in the same manner as has been described in Kim et al., (2010) *Chem. Commun.* 46: 7433-7435, incorporated herein by reference in its entirety). Isopropanol formed during the sol-gel reaction acts as a non-solvent for PLA and also decreases the emulsion solution polarity. The decreased polarity results in an increase in PLA solubility and thus a decrease in recovered microparticle material over longer evaporation times. The isopropanol acts as a non-solvent causing increased porosity in all samples. We also used 2-methyl pentane as a non-solvent to increase porosity over that produced by isopropanol alone. After collection and drying of the microparticles, the microparticles were then exposed to methanol for 24 hrs to induce the mineralization of the titania.

In situ Sol-Gel Reaction Optimization: The sol-gel reactions conditions were examined to optimize the formation of $TiO_2$ by testing the photocatalytic activity versus sol-gel reaction time for 15, 30, 45, and 60 minutes at both 10% titania and 20% titania. It was found for both the 10% and 20% titania samples that the 15 and 30 minute samples degraded the most dye and dye degradation decreased over increasing sol-gel reaction time periods.

Both the 10% and 20% $TiO_2$ samples showed almost the same activity for the 15 min sol-gel reaction time. The 20% $TiO_2$ samples exhibited a much sharper decrease in photocatalytic degradation as the sol-gel reaction time was increased from 15 minutes compared to the 10% $TiO_2$ The longer reaction times may produce inferior titania nanoparticles while also producing microparticles that have higher porosity. As the reaction time was increased, the size of the titania formed increased. Furthermore, methanol mineralization may be less efficient on larger particles. With a larger number of smaller titania nanoparticles, there is a much higher reactive surface area. The increased amount of isopropanol produced over extended reaction times also helped to increase the porosity.

In situ PLA/$TiO_2$ Microparticle Morphology: The in situ hybrid microparticles generated by the methods of the present disclosure were observed under optical microscope at 40× magnification. The hybrid microparticles appeared as porous sponges of irregular shapes and ranged in size from about 100 µm to about 300 µm. The visible surface roughness increased from the 10:0 microparticles to the 6:4 microparticles for both the 10% and 20 titania. It was noted that there was more visible roughness of all of the hybrid microparticles than for the most porous composite microparticles due to the presence or isopropanol.

Figure 2A:
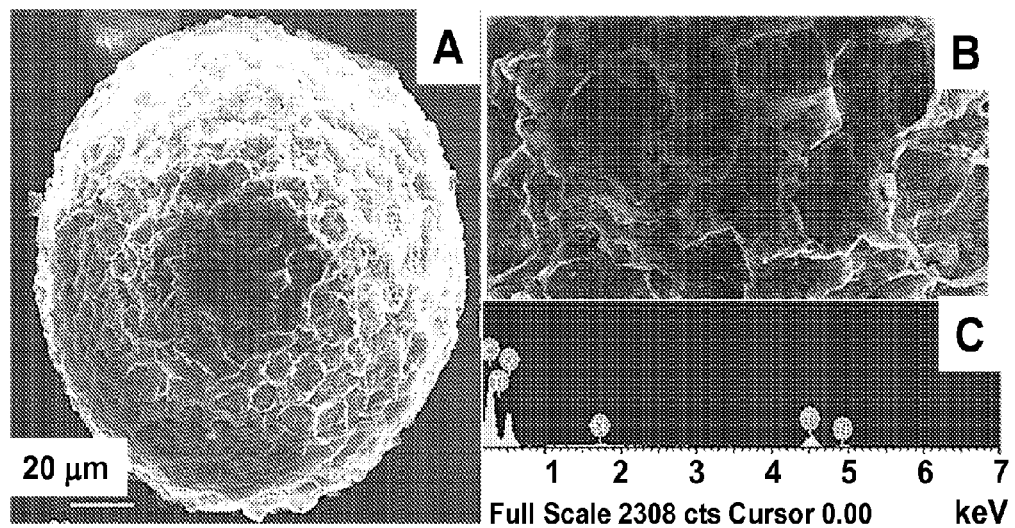
FIGS. 2A and 2B illustrate digital SEM images of an intact porous in situ hybrid microparticle (FIG. 2A) and a cross sectional view thereof (FIG. 2B).
Figure 2B:
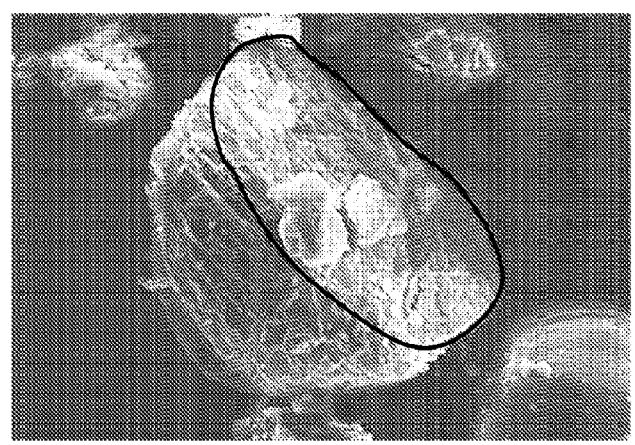
Figure 12:
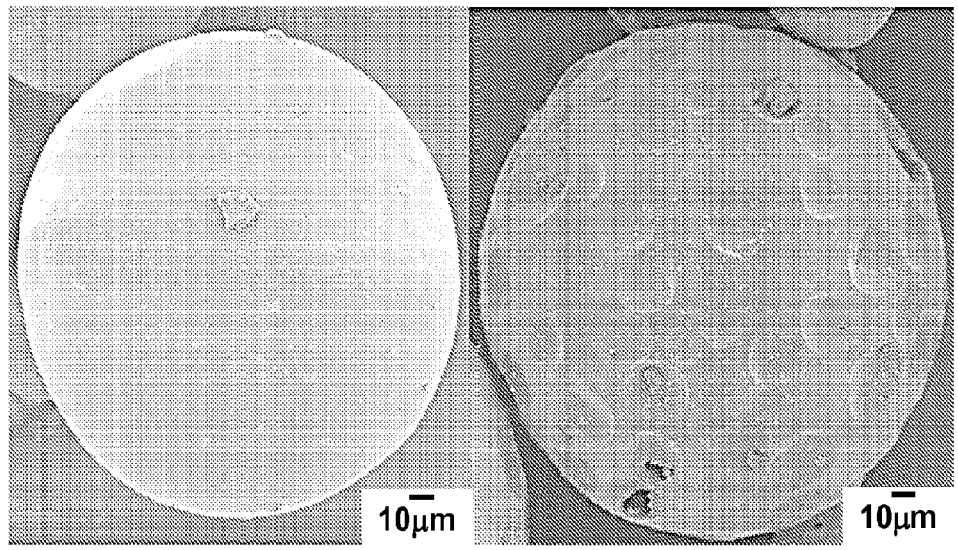
FIG. 12 is a pair of digital SEM images of directly mixed particles. On the left, the particles contained 10% $TiO_2$ mixed with PLA; on the right, the particles contained 20% $TiO_2$ mixed with PLA. 2MP was added to form porous particles.
Figure 13:
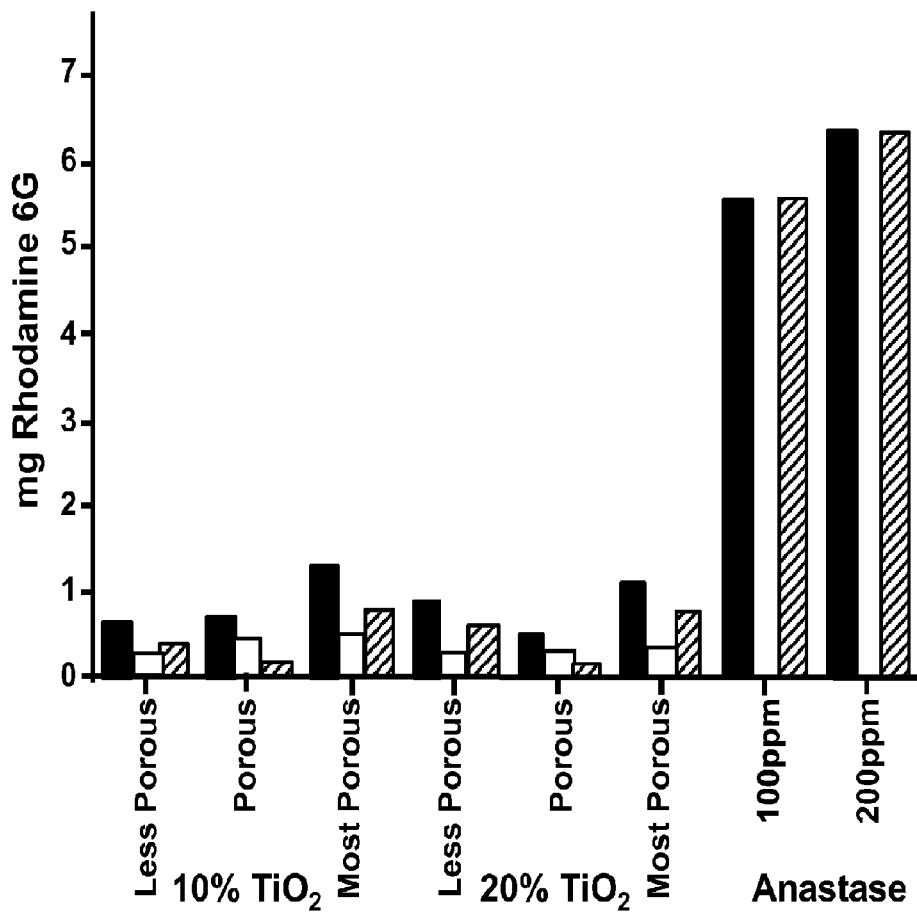
FIG. 13 is a graph illustrating the dye rhodamine 6G degradation results. The dye degradation was analyzed by exposing the microparticles to a rhodamine 6G solution for 2 hours under UV irradiation and then the amount of rhodamine 6G removal was quantified.
Figure 14:
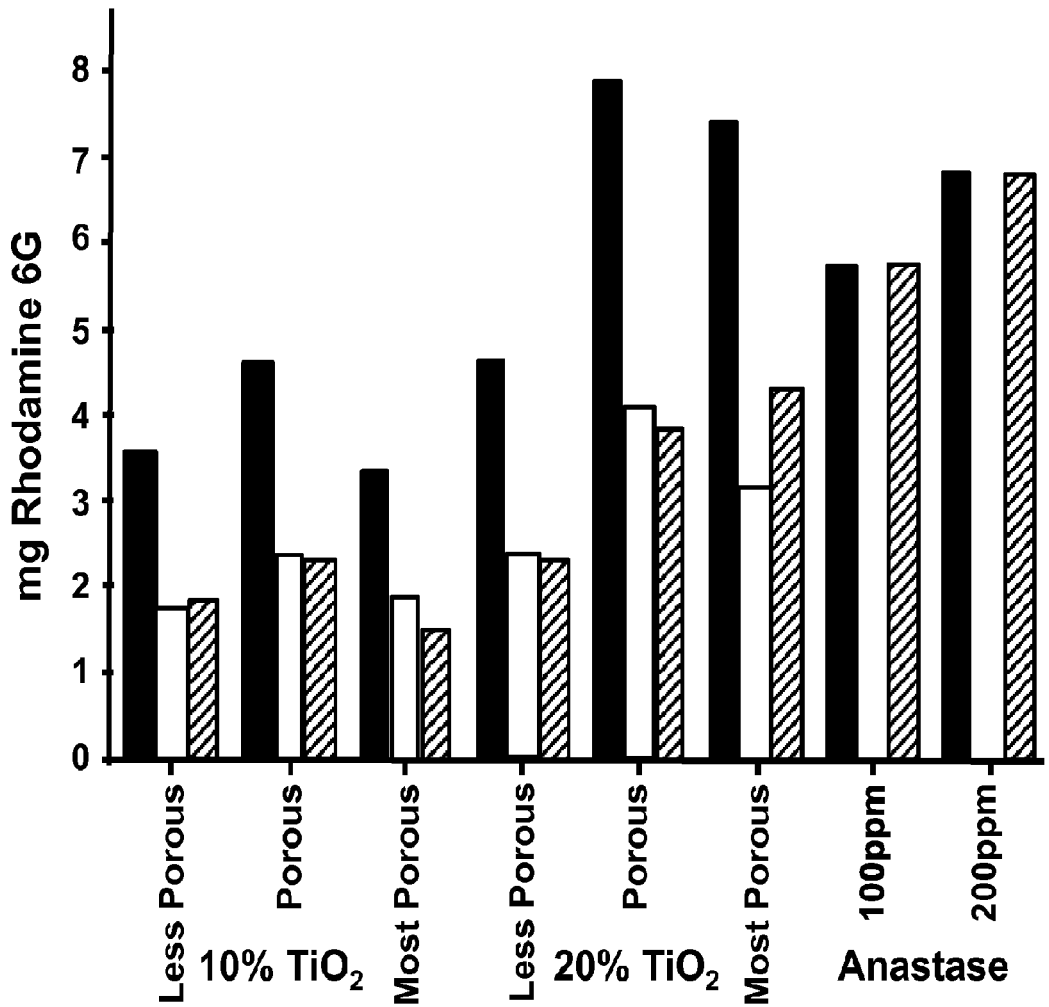
FIG. 14 is a graph illustrating dye degradation of in situ microparticles with differing amounts of titania.

The optimized hybrid microparticles (6:4, 15 min. sol-gel, both 10% and 20% titania) were selected for imaging by SEM, as shown in FIGS. 2A, 2B, and 12. The hybrid particles were observed in the form of many irregular shapes but there were also many spherical microparticles. The dimensions of the particles were ranged in size from about 50 µm to about 300 µm. The particles were very porous and many of the particles appeared to be combinations of many smaller microparticles fused together.

Figure 9A:
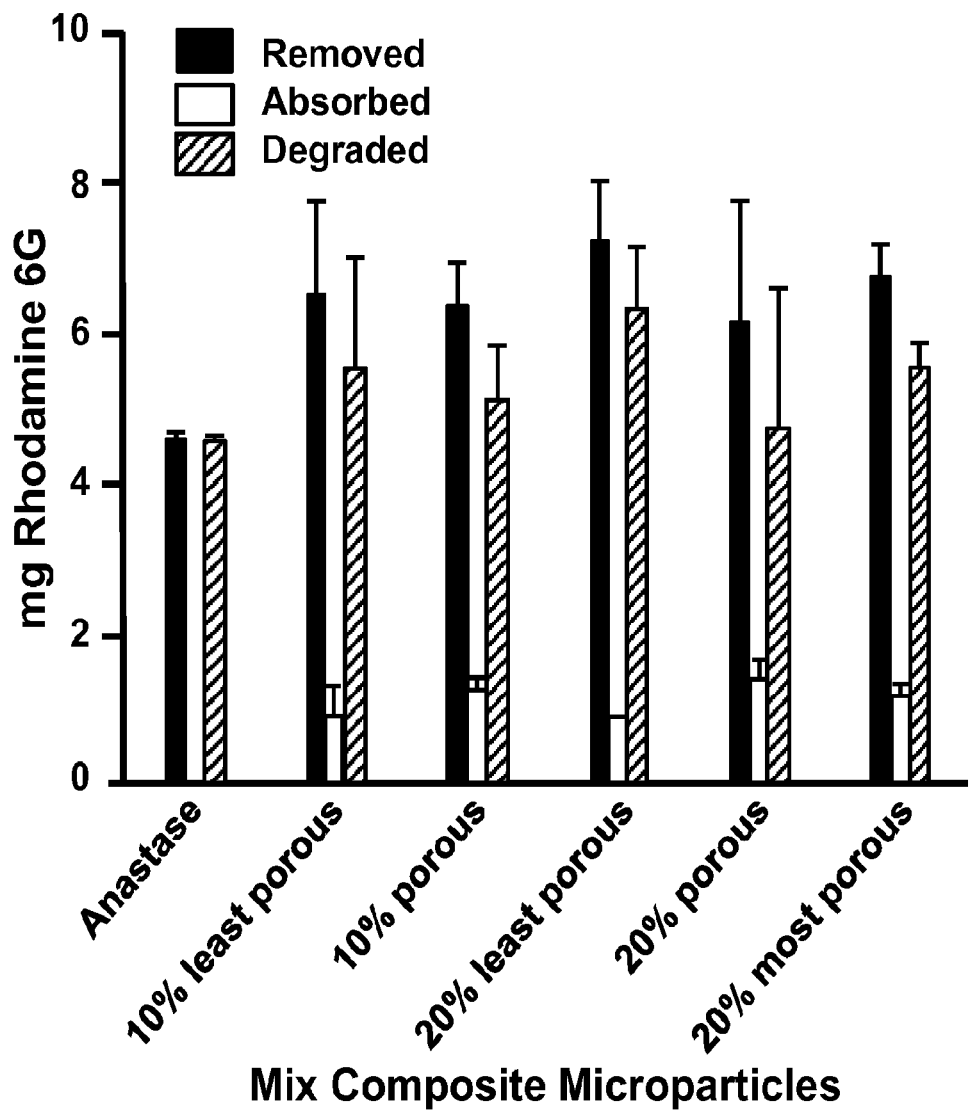
FIG. 9A is a graph illustrating the degradation of the dye Rhodamine 6G by mixed composition microparticles according to the present disclosure.
Figure 9B:
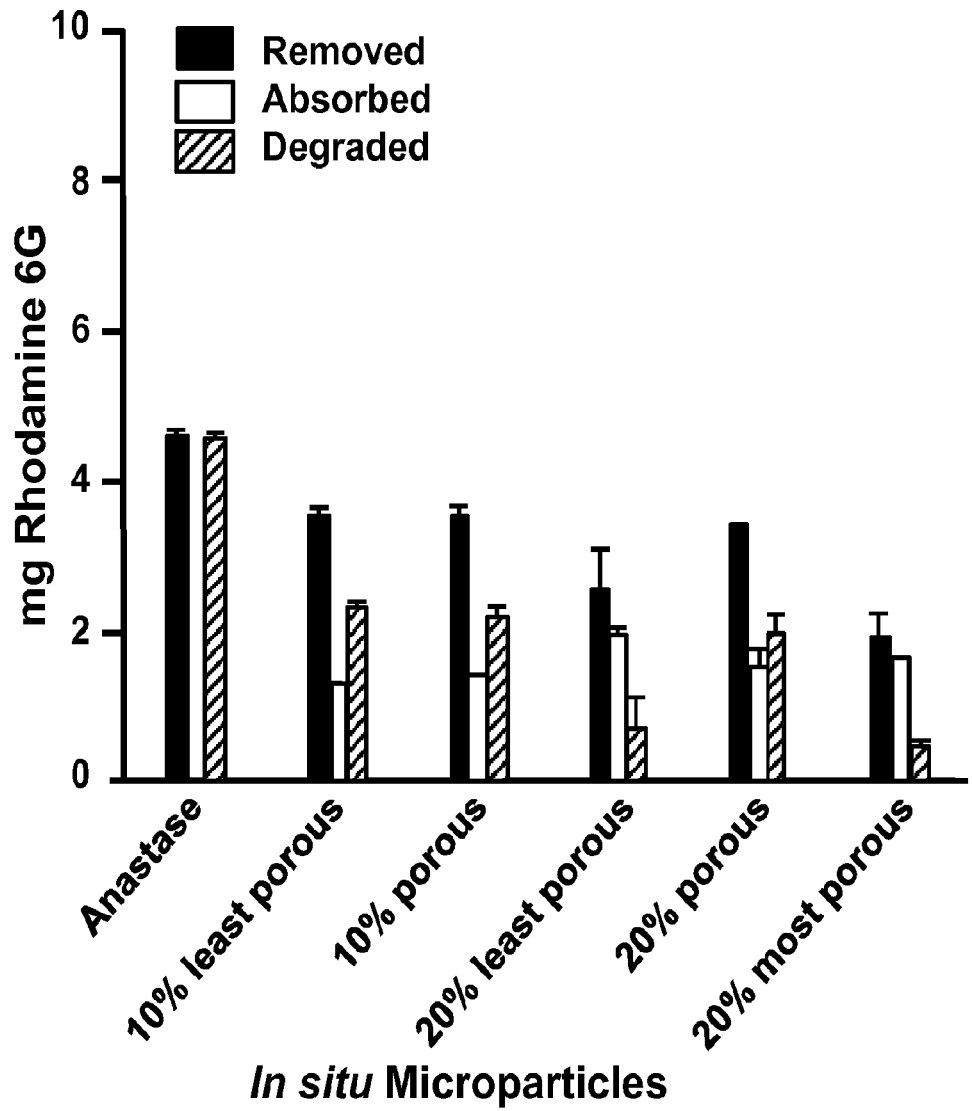
FIG. 9B is a graph illustrating the degradation of the dye Rhodamine 6G by in situ hybrid microparticles according to the present disclosure.
Figure 10A:
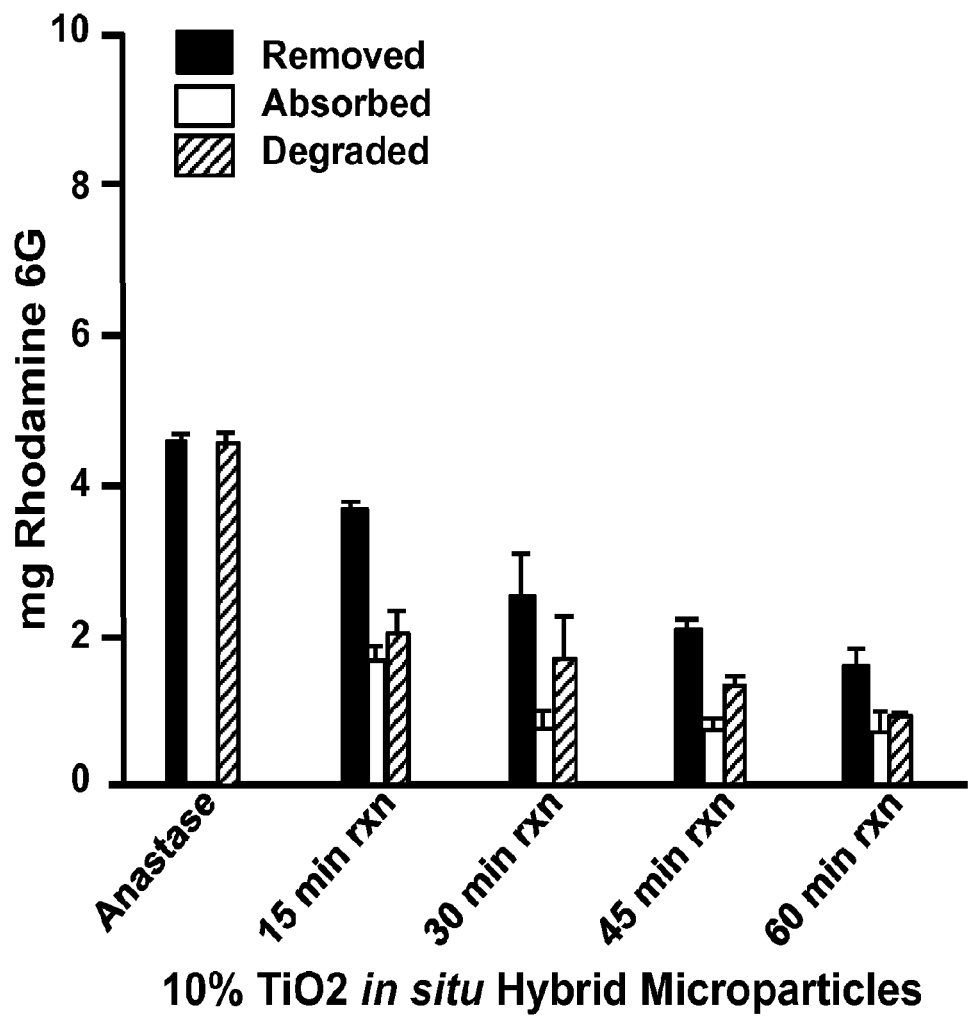
FIG. 10A is a graph illustrating the degradation of the dye Rhodamine 6G by in situ hybrid microparticles having 10% $TiO_2$ content according to the present disclosure.
Figure 10B:
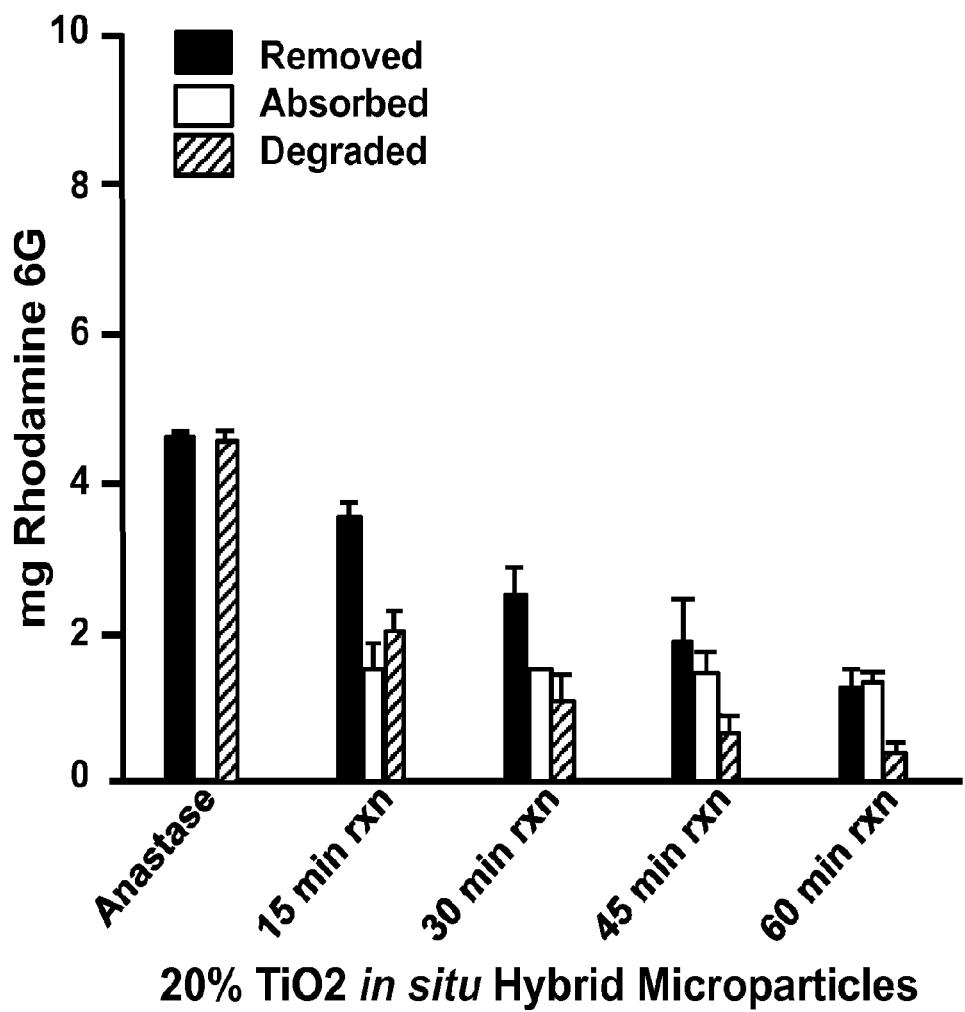
FIG. 10B is a graph illustrating the degradation of the dye Rhodamine 6G by in situ hybrid microparticles having 10% $TiO_2$ content according to the present disclosure.
Figure 11:
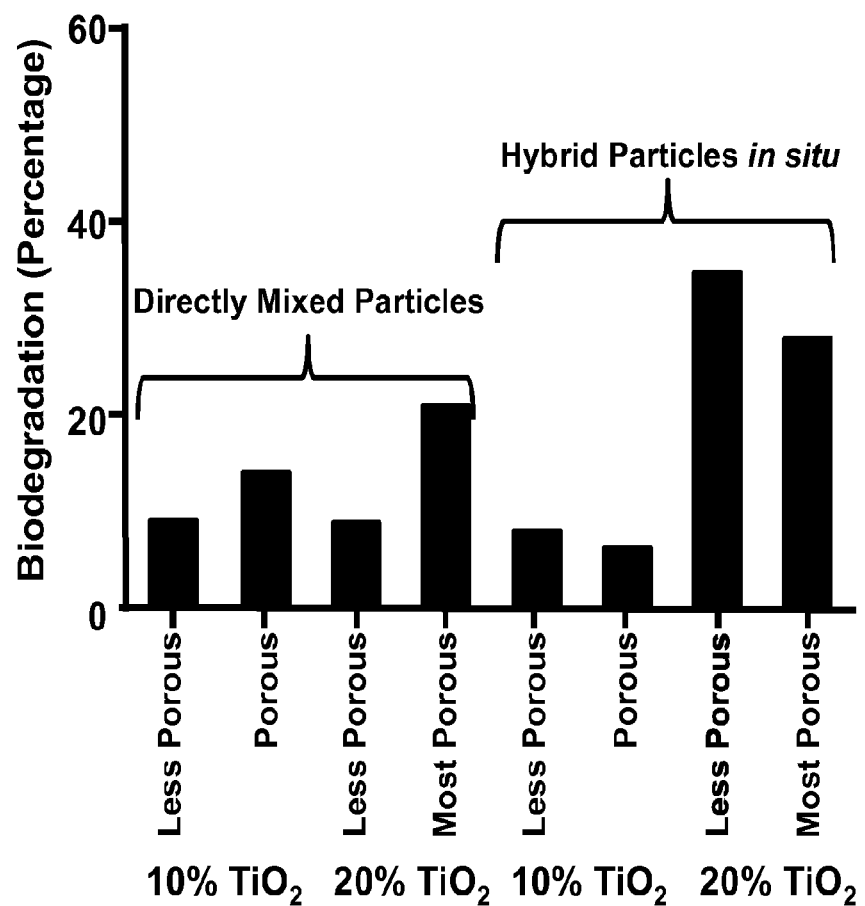
FIG. 11 is a graph illustrating the biodegradation of mixed composite and in situ hybrid

In situ PLA/$TiO_2$ Microparticle Photocatalytic Activity: Microparticles were tested for photocatalytic activity using a model dye, rhodamine 6G. The results of the dye degradation experiments over a two hour time period (FIGS. 9A and 9B) showed that the in situ microparticles both absorbed and degraded the model dye. The microparticles with 10% $TiO_2$ exhibited an increase in absorption capacity as the porosity increased but also exhibited a decrease in degradation. The microparticles with 20% $TiO_2$ showed less degradation than the microparticles with 10% $TiO_2$ but had a similar absorption capacity. Overall these microparticles had reduced photocatalytic activity as the anatase standard, which had an equivalent amount of titania as the 10% $TiO_2$ microparticles.

Figure 4:
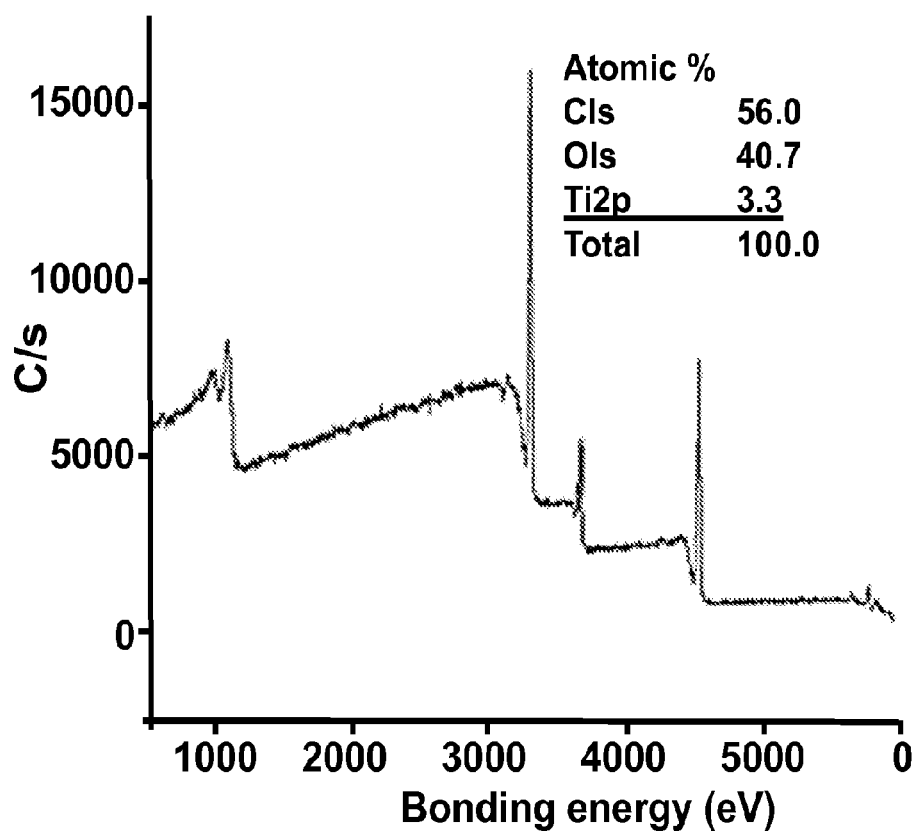
FIG. 4 is a graph illustrating an XPS spectrum of in situ hybrid microparticles.
Figure 5:
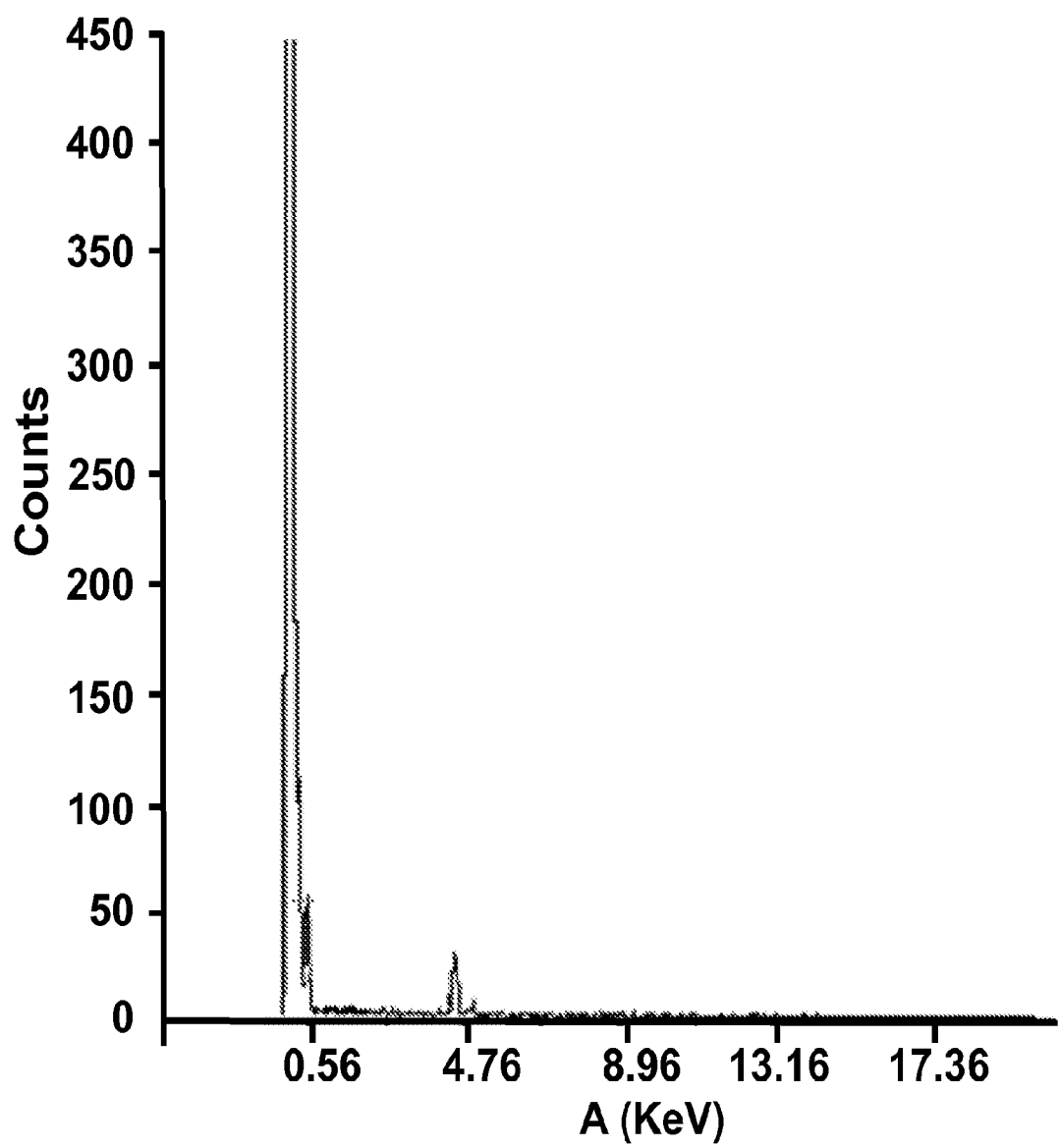
FIG. 5 is a graph illustrating an EDS spectrum of in situ hybrid microparticles.

Titania content of PLA/$TiO_2$ Microparticles: To test the microparticles to determine the presence of titania, EDS and XPS spectra of the particles were taken. Both the EDS and XPS spectra (FIGS. 4 and 5) showed the presence of the titanium and oxygen of titania, but the presence of crystalline allotropes could not be confirmed by this method. In situ prepared titania microparticles that had been prepared with and without methanol treatment were compared. Both samples prepared with and without methanol treatment showed the presence of titanium.

Figure 3:
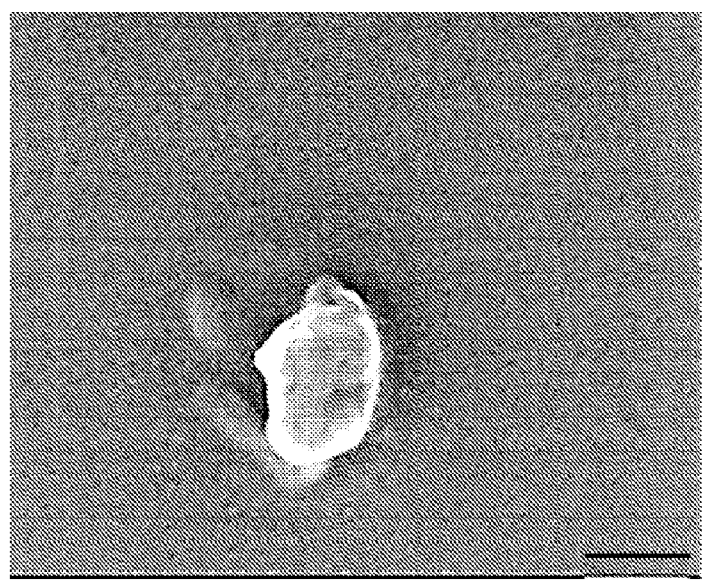
FIG. 3 illustrates a digital SEM image of a titania nanoparticle obtained after dissolution of porous in situ hybrid microparticles.
Figure 6:
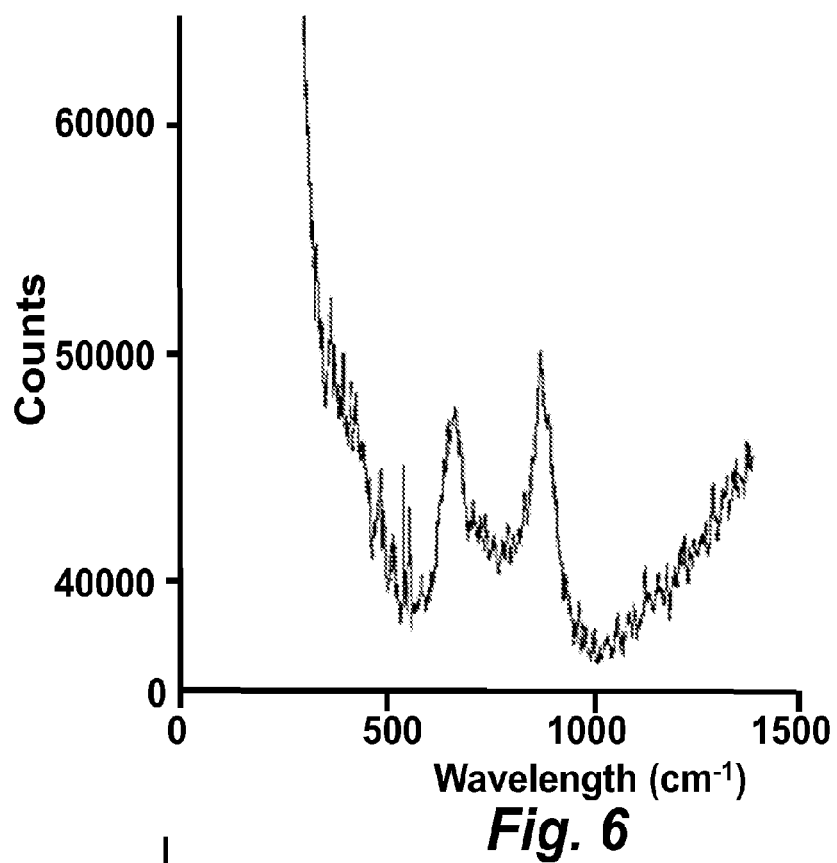
FIG. 6 is a graph illustrating a Raman spectrum of microparticles with methanol treatment
Figure 7:
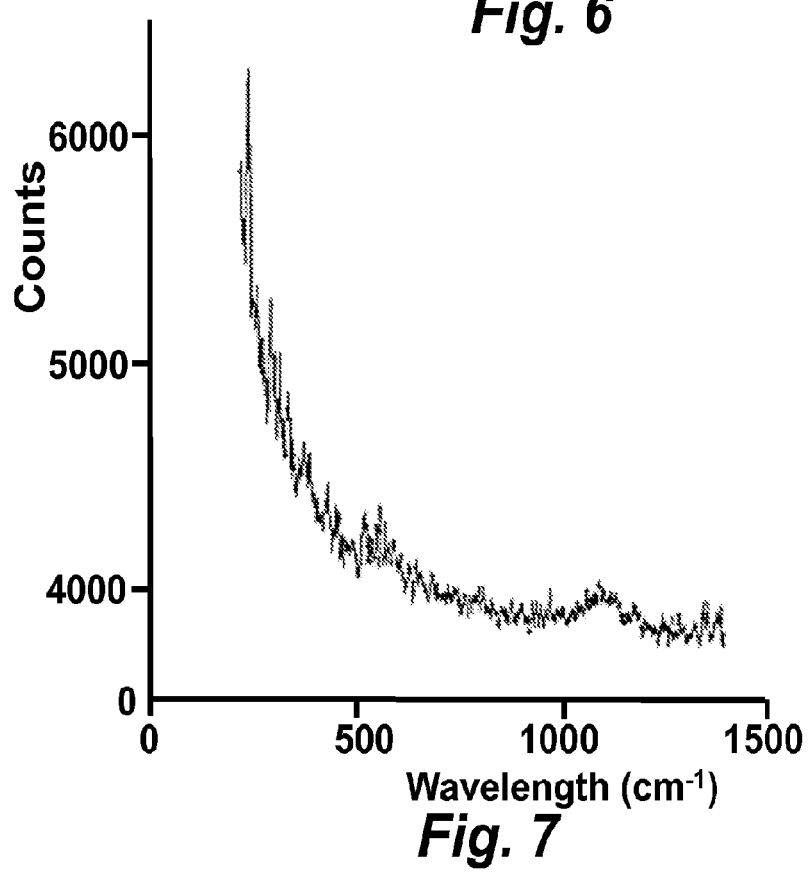
FIG. 7 is a graph illustrating a Raman spectrum of microparticles without methanol treatment
Figure 8:
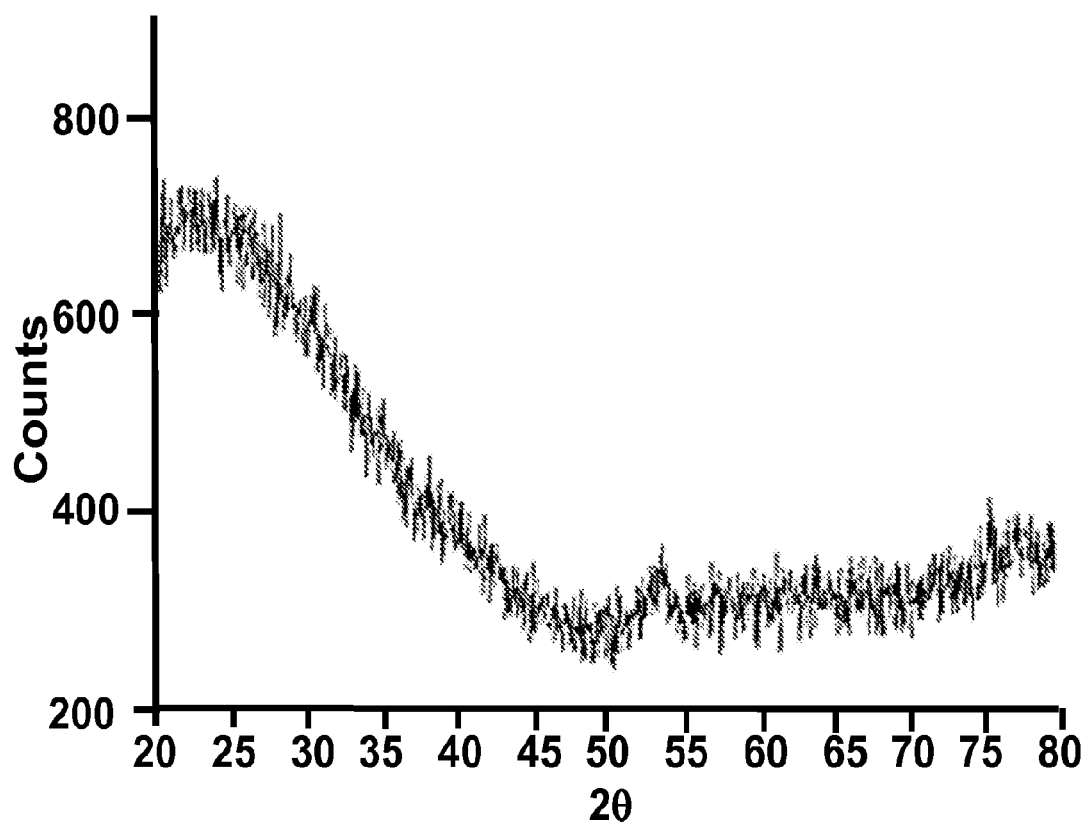
FIG. 8 is a graph illustrating an XRD pattern of in situ hybrid $TiO_2$/PLA microparticles after PLA digestion.

Raman spectroscopy, as shown in FIGS. 6 and 7, was performed to determine the crystalline nature of the titania. To do this, the polymer matrix was removed by a one molar NaOH aqueous solution (an SEM image of such a treated microparticle is shown in FIG. 3). The residue was then used for Raman analysis. The Raman analysis of the samples showed that there was crystalline structure present. The observed peaks were very broad and did not correspond to any previously reported values for either anatase or rutile titania. This result corresponds to other previous work where silafin was used as a platform for titania formation.

These results show that there are very small crystalline domains as well as areas of amorphous titania present. The broadness of the peaks indicates that the crystalline areas are small and isolated.

The Raman spectra of prepared microparticles that had not been treated with methanol (FIG. 6) were also obtained. These microparticles did not exhibit any peaks characteristic of crystalline structure indicating that the titania present was completely amorphous.

Mixed Composite PLA/$TiO_2$ Microparticles: This study was initially focused on forming biodegradable PLA composite microparticles that have preformed titania incorporated. This approach has been performed to process many different forms of materials but it had not been used to make microspheres (Liu et al., (2006) *J. Biomed. Mat. Res.,* 78A: 798-807; Liu et al., (2005) *Nanotechnology* 16: S601-S608; Liu et al., (2006) *Int. J. Nanomed.* 1: 541-545; Mazzocchetti & Scandola (2009) *Appl. Mater. Inter.* 1: 726-734; Buzarovska et al., (2009) *J. Appl. Polym. Sci.* 114: 3118-3124). The formation of the composite $TiO_2$/PLA microparticles was met with limited success because the $TiO_2$ powder readily precipitates so it must be continually stirred during the casting process. Although the solution was continually mixed there was still inefficient and non-uniform incorporation of titania in the microparticles. These hybrid microparticles did degrade the model dye but there was not an increase in dye degradation when the concentration of titania in the microparticles was increased. These particles also exhibited poor absorption capacity which can slow down the dye degradation for high dye loading.

Mixed Composite PLA/TiO$_2$ Microparticle Morphology: The composite microparticles were observed under optical microscope at 40× magnification. The composite particle appeared to be similar in shape and size to PLA microparticles that were prepared under the same conditions. The particles were spherical and ranged in size from about 100 µm to about 300 µm. The visible surface roughness increased from the 10:0 microparticles to the 6:4 microparticles for both the 10% and 20% titania.

Due to the limitations for composite particles we then focused on forming titania in situ. Previously it was reported that methanol can be used as a mineralization agent for titania (Kroger et al., (2006) *Angew. Chem. Int. Ed.* 45: 7239-7243).

The present disclosure provides, therefore, multifunctional hybrid polymer microparticles with in situ formed anatase. These microparticles can both absorb a model organic dye as well as degrade the dye under UV irradiation. We have also demonstrated an additional mixed hybrid composite system. The mixed hybrid microparticles have the same multifunctionality as the in situ hybrid microparticles but exhibited some limitations in the formation of the microparticles.

Degradation of PLA/TiO2 particles: The degradation behavior of PLA depends on factors such as molecular weight and higher order structures. Other important factors such as temperature, pH, light and catalytic species also alter can the biodegradation behavior. In addition, the TiO$_2$ in the hybrid particles can also affect the degradation of PLA/TiO$_2$ particles because a desired property of TiO$_2$ is to degrade organic compound.

Figure 15A:
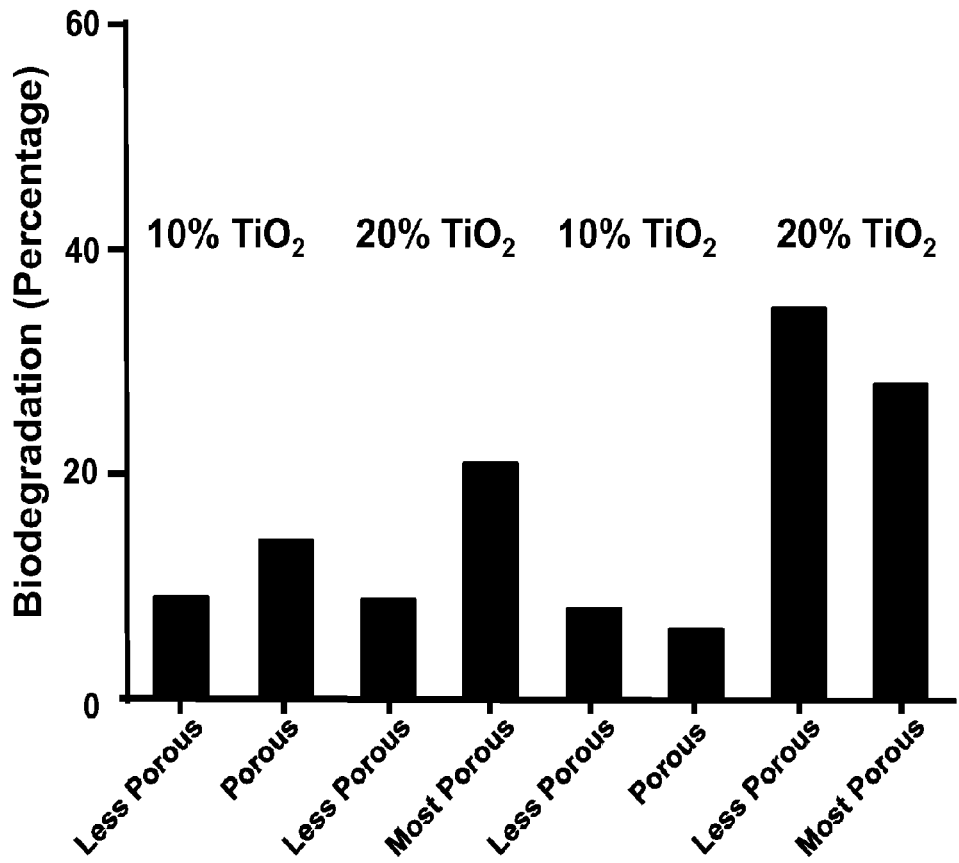
FIG. 15A is a graph illustrating biodegradation of in situ microparticles with differing amounts of titania. The biodegradation of particles was analyzed by exposing the microparticles to UV irradiation. 2 weeks data is shown. The percentage of biodegradable product loss was determined.
Figure 15B:
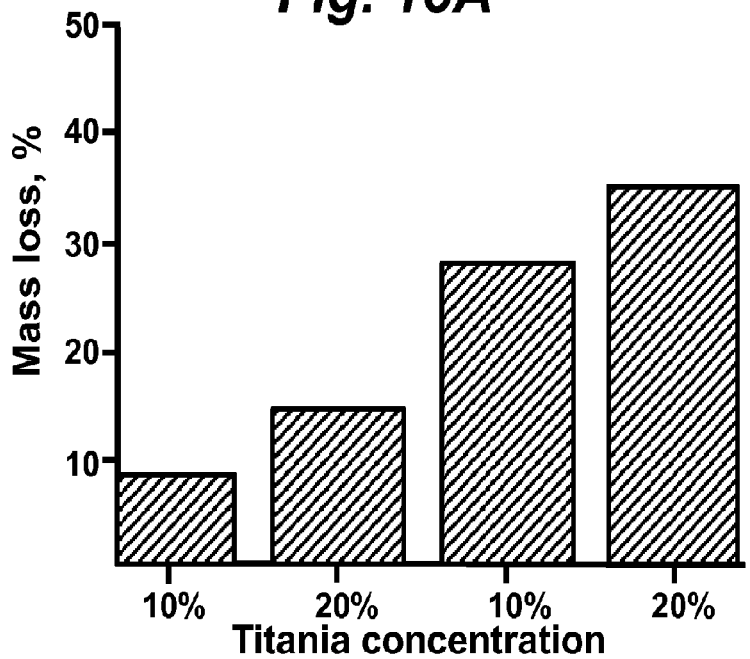
FIG. 15B is a graph illustrating mass loss due to biodegradation of in situ microparticles with differing amounts of titania. The biodegradation of particles was analyzed by exposing the microparticles to UV irradiation. 2 weeks data is shown. The percentage of biodegradable mass loss was determined.

The microparticles were exposed to UV irradiation for 2 weeks to observe the degradation behavior. After 2 weeks, there was very little weight loss of pure PLA microparticles. For all PLA/TiO$_2$ particles there was observed weight loss. FIG. 15 shows that all particles biodegraded over the two week experimental time. For directly mixed composite particles, less porous particles had less weight loss after 2 weeks UV irradiation than the more porous particles. Particles which contained 20% TiO$_2$ exhibited higher degradation ability than the particles with 10% TiO$_2$. The in situ hybrid particles showed a slightly lower degradation for the 10% TiO$_2$ than the mixed composite particles. Additionally, the in situ hybrid particles with 20% TiO$_2$ showed much higher degradation than the mixed composite particles.

Thus, the in situ hybrid particles have both absorptive and degradative properties in addition to increased biodegradation over PLA. These materials can be useful for a variety of remediation needs, and can be integrated in many current systems for environmental restoration, water purification and the like.

One aspect of the present disclosure, therefore, provides embodiments of a hybrid microparticle comprising photocatalytically active titanium dioxide and a poly-(D,L-lactic acid) polymer, where the microparticle comprises a plurality of pores.

In embodiments of this aspect of the disclosure, the titanium dioxide can be embedded in a polymer comprising poly-(D,L-lactic acid).

In embodiments of this aspect of the disclosure, the titanium dioxide can comprise anatase titanium dioxide nanoparticles coated in a polymer comprising poly-(D,L-lactic acid).

In embodiments of this aspect of the disclosure, the hybrid microparticle has at least one dimension in the range of about 50 µm to about 400 µm.

In embodiments of this aspect of the disclosure, the hybrid microparticle can have at least one dimension in the range of about 100 µm to about 300 µm.

In embodiments of this aspect of the disclosure, the microparticle on contacting an organic compound and irradiated with light energy can degrade the organic compound.

In embodiments of this aspect of the disclosure, the microparticle can be degradable on prolonged irradiation by light energy.

Another aspect of the present disclosure encompasses embodiments of a method of photocatalytically degrading an organic compound in an aqueous liquid comprising: (i) adding hybrid microparticles according to the disclosure to an aqueous liquid having an organic compound desired to be degraded; and (ii) irradiating the hybrid microparticles with light energy, thereby photocatalytically degrading an organic compound in contact with the titanium dioxide of the hybrid microparticles.

In embodiments of this aspect of the disclosure, the organic compound can be, but is not limited to, a hydrocarbon, a biomolecule, an industrial waste product, or an agricultural waste product.

In embodiments of this aspect of the disclosure, the method can further comprise the step of allowing the hybrid microparticles to degrade.

Another aspect of the present disclosure encompasses embodiments of a method for generating photocatalytically capable porous hybrid microparticles comprising the steps of: combining in an organic solvent a poly-(D,L-lactic acid) or a poly-(lactic-co-glycolic acid), and a titanium oxide; (ii) adding 2-methylpentane to form a polylactide:titanium oxide: 2-methylpentane mixture; (iii) adding the polylactide: titanium oxide: 2-methylpentane mixture to a solution of polyvinyl alcohol (PVA) thereby forming an emulsion; (iv) allowing the organic solvents to evaporate, thereby forming microparticles; (v) isolating the microparticles; (vi) contacting the isolated microparticles with methanol, thereby generating porous photocatalytically capable microparticles; and (vii) isolating the photocatalytically capable porous hybrid microparticles from the methanol.

In embodiments of this aspect of the titanium oxide is combined with poly-(D,L-lactic acid).

In embodiments of this aspect of the disclosure, the titanium oxide can be titanium tetraisopropoxide (TTIP) or anatase titanium dioxide.

In embodiments of this aspect of the disclosure, the titanium oxide can be titanium tetraisopropoxide and forms covalent bonds with the poly-(D,L-lactic acid).

In embodiments of this aspect of the disclosure, the organic solvent can be chloroform or dichloromethane.

In embodiments of this aspect of the disclosure, the organic sol vent can be dichloro methane and the ratio of dichloromethane to the poly-(D,L-lactic acid):titanium oxide: 2-methylpentane mixture can be between about 13:1 to about 18:1.

In embodiments of this aspect of the disclosure, the ratio of poly-(D,L-lactic acid)+titanium oxide: 2-methylpentane can be from about 10:0 to about 3:2.

In embodiments of this aspect of the disclosure, the ratio of poly-(D,L-lactic acid)+titanium oxide: 2-methylpentane can be about 3:2.

In embodiments of this aspect of the disclosure, the photocatalytically capable microparticle can have between about 10% titanium dioxide to about 30% titanium dioxide.

In embodiments of this aspect of the disclosure, the photocatalytically capable microparticle can have about 10% titanium dioxide or about 20% titanium dioxide.

The specific examples below are to be construed as merely illustrative, and not limitative of the remainder of the disclosure in any way whatsoever. Without further elaboration, it is believed that one skilled in the art can, based on the description herein, utilize the present disclosure to its fullest extent. All publications recited herein are hereby incorporated by reference in their entirety.

It should be emphasized that the embodiments of the present disclosure, particularly, any "preferred" embodiments, are merely possible examples of the implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure, and the present disclosure and protected by the following claims.

The following examples are put forth so as to provide those of ordinary skill in the art with a complete disclosure and description of how to perform the methods and use the compositions and compounds disclosed and claimed herein. Efforts have been made to ensure accuracy with respect to numbers (e.g., amounts, temperature, etc.), but some errors and deviations should be accounted for. Unless indicated otherwise, parts are parts by weight, temperature is in ° C., and pressure is at or near atmospheric. Standard temperature and pressure are defined as 20° C. and 1 atmosphere.

EXAMPLES

Example 1

Materials: Anatase $TiO_2$ powder (Acros), titanium tetraisopropoxide (TTIP, Acros), dichloromethane (DCM, Acros), methanol (Acros), polyvinyl alcohol (MW=72,000, MP Biomedicals), Polysorbate 20 (MP Biomedicals), sodium azide (MP Biomedicals), and 2-methylpentane (2MP, Aldrich) were used without further purification. The poly-(D,L-lactic acid) (PLA $M_n$=136,000) was injection grade.

Example 2

Formation of Hybrid Microparticles: In situ hybrid microparticles were formed using the ratios of 10:0, 8:2, and 6:4 PLA+TTIP:2MP. For all in situ hybrid microparticles, a ratio of 13.5:1 DCM to PLA+TTIP+2MP was used. The table below summarizes the amount of each component used in the formation of the microparticles.

TABLE 1

| Sample ID | PLA | TTIP | 2MP | DCM |
|---|---|---|---|---|
| 10% 10:0 10 min | 0.4690 | 0.1854 | 0.0000 | 8.8 |
| 10% 8:2 10 min | 0.4852 | 0.1918 | 0.1693 | 11.4 |
| 10% 6:4 10 min | 0.4700 | 0.1872 | 0.3481 | 11.7 |
| 20% 10:0 10 min | 0.5138 | 0.4571 | 0.0000 | 13.1 |
| 20% 8:2 10 min | 0.4525 | 0.4025 | 0.2138 | 14.4 |
| 20% 6:4 10 min | 0.4505 | 0.4008 | 0.5674 | 19.2 |
| 10% 6:4 15 min | 0.4011 | 0.1586 | 0.3731 | 12.6 |
| 10% 6:4 30 min | 0.3971 | 0.1570 | 0.3694 | 12.5 |
| 10% 6:4 45 min | 0.4288 | 0.1695 | 0.3989 | 13.5 |
| 10% 6:4 60 min | 0.4268 | 0.1688 | 0.3971 | 13.4 |
| 20% 6:4 15 min | 0.4273 | 0.3801 | 0.5383 | 18.2 |
| 20% 6:4 30 min | 0.4258 | 0.3788 | 0.5364 | 18.1 |

TABLE 1-continued

| Sample ID | PLA | TTIP | 2MP | DCM |
|---|---|---|---|---|
| 20% 6:4 45 min | 0.4019 | 0.3575 | 0.5063 | 17.1 |
| 20% 6:4 60 min | 0.4138 | 0.3682 | 0.5213 | 17.6 |

A sample procedure for the formation of porous hybrid Titania/PLA microparticles is as follows: PLA (0.4258 g) was dissolved into 16.1 mL DCM (2.58% w/v). 0.3788 g TTIP (estimated 10% w/w $TiO_2$ in final product PLA microspheres) was dissolved into 1 mL DCM (0.952 M). The TTIP and PLA solutions were mixed together, vortexed for 30 seconds, and allowed to react, in the dark, for 30 minutes. 0.5364 g 2MP (6:4 ratio by weight; PLA+TTIP:2MP) was dissolved in 1 mL DCM (4.14 M). 1 mL DCM was used for both the TTIP and 2MP, the volume used to dissolve PLA was enough DCM so that the total ratio of DCM to PLA+TTIP+2MP was 13.5:1. The 2MP solution was added to the PLA+TTIP solution after 30 minute reaction time was completed. The mixture was vortexed for 30 seconds. The solution was immediately drawn into a syringe equipped with a 20 G needle and added dropwise to a PVA solution (300 mL; 1% PVA, 0.2% polysorbate 20, and 0.1% $NaN_3$) that was stirred at 300 rpm. The emulsion was stirred for 1 hour after complete addition to allow the organic solvents to evaporate. The emulsion was then filtered through course filter paper. The microparticles were collected and exposed to methanol for 24 hrs to induce mineralization. After 24 hrs the methanol was removed by rotary evaporation under vacuum at 180 RPM and 50° C.

Example 3

Formation of Composite Microparticles: Mix composite microparticles were formed using the ratios of 10:0, 8:2, and 6:4 PLA+$TiO_2$:2MP. For all 10% $TiO_2$ mix composite microparticles, a ratio of 13.5:1 DCM to PLA+$TiO_2$+2MP was used and for all 20% $TiO_2$ mix composite microparticles, 18:1 DCM to PLA+$TiO_2$+2mp was used. Table 2 below summarizes the amount of each component used in the formation of the microparticles.

TABLE 2

| Sample ID | PLA | $TiO_2$ | 2MP | DCM |
|---|---|---|---|---|
| 10% 10:0 | 1.0160 | 0.1110 | 0.0000 | 10.2 |
| 10% 8:2 | 1.0070 | 0.1100 | 0.2792 | 12.6 |
| 10% 6:4 | 0.4028 | 0.0448 | 0.2984 | 10.1 |
| 20% 10:0 | 0.4122 | 0.1031 | 0.0000 | 9.3 |
| 20% 8:2 | 0.4101 | 0.1027 | 0.1282 | 11.5 |
| 20% 6:4 | 0.3974 | 0.0997 | 0.3314 | 14.9 |

A sample procedure for the formation of porous composite Titania/PLA microparticles is as follows: 0.4028 g PLA was dissolved in 9.1 mL DCM (4.24%). 0.0448 g $TiO_2$ (10% w/w in PLA microspheres) anatase powder was added to the PLA solution. 0.2984 g 2MP (6:4 ratio by weight; PLA+$TiO_2$:2MP) was dissolved in 1 mL DCM (2.64 M). 1 mL DCM was used for the 2MP, the volume used to dissolve PLA was enough DCM so that the total ratio of DCM to PLA+$TiO_2$+2MP was 13.5:1. The PLA+$TiO_2$ solution was added to the 2MP solution and vortexed for 1 minute to allow for complete suspension of $TiO_2$ powder. The solution was immediately drawn into a syringe equipped with a 20 G needle and added dropwise to a PVA solution (300 mL; 1%PVA, 0.2% polysorbate 20, and 0.1% $NaN_3$) that was stirred at 300 rpm. The emulsion was stirred for 3 hrs after complete addition to allow the organic solvents to totally evaporate. The emulsion was then filtered through course filter paper. The microparticles were collected and dried under vacuum at 50° C. for 3 hrs.

Example 4

Model Dye Degradation Procedure: The dye degradation was analyzed by exposing 0.0100 g of the microparticles to a 10 mL of 10 ppm rhodamine 6G for 2 hrs under UV irradiation. After 2 hrs the samples were centrifuged at 10,000 RPM for 30 min. The supernatant liquid was removed and measured by UV-Vis spectroscopy and the amount of rhodamine 6G removal was quantified.

Example 5

Model Dye Sorption Procedure: Since the microparticles absorb the dye as well as degrade, the absorption was studied. To determine the amount of absorption, 10 mL of 0.25 M NaOH in methanol was added to the microparticles after removal of the supernatant. The solution was mixed and filtered. The supernatant liquid was analyzed by UV-Vis spectroscopy and the amount of rhodamine 6G that leached out of the particles was quantified.

Example 6

Microparticle Degradation: The biodegradation of the microparticles was analyzed by exposing 0.0100 g of the microparticles suspended in 10 mL of deionized water to UV irradiation. UV irradiation was provided by two 18 inch long 60 Watt UV fluorescent lamps. The lamps were mounted 20 cm above the surface of the suspensions in a cabinet without any additional illumination. The samples were exposed for a two week period and removed after exactly 14 days. Samples were dried at room temperature under vacuum and the mass was taken. The values reported are the percent of the original mass that was not recovered.

Example 7

Microparticle Digestion: The $TiO_2$/PLA microparticles were digested to extract the titania from the polymer matrix for measurements. For this, 0.05 g of microparticles was added to a vial. To the vial, 10 mL of 1.00 M NaOH was added. The solution was stirred under ambient conditions for 72 hrs. The aqueous solution was decanted off and then the remaining solid was rinsed with 10 mL DI water followed be decanting the liquid 3 times. The solid was then allowed to dry in a desiccator overnight.

Example 8

UV-Vis: UV-VIS spectroscopy was performed using a Cary 50 spectrometer. A baseline correction was used before measurements were taken.

Example 9

XPS: A PHI 5000 Versaprobe imaging x-ray photoelectron spectrometer (XPS), operating a monochromatic, focused Al K-α x-ray source (E=1486.6 eV) at 25 W with a 100 μm spot size, was used to determine the chemical bonding of the samples. The samples were grounded and charge neutralization was provided by a cold cathode electron flood source and low-energy Ar-ions. All measurements were taken at room temperature and at a pressure of $2 \times 10^{-6}$ Pa; the system base pressure is $5 \times 10^{-8}$ Pa. The energy scale was calibrated with reference to the Ag 3d peak. Surface contamination is removed with Ar-ion sputter etching for 1 min at 1 kV; this removes 2.6 nm from the surface. Surface cratering, due to sputter etching, is limited by rastering the beam across a $2 \times 2$ mm$^2$ area. Survey scans, with pass energy of 187 eV and 1 eV step size, and high-resolution scans, with pass energy of 23.5 eV and 0.2 eV step size, were taken both before and after surface cleaning by sputter-etching. The chemical compositions and bonding states of the films were determined using Multipak v9.0.

Example 10

Raman: Raman spectroscopy was performed using a dilor XY Laser Modular Spectrometer. An Olympus BH-2 microscope with a modified Newport micrometer stage made from two center drilled 426 series stages was used as the sample area. A liquid nitrogen cooled Spec 10 system CCD was used as a detector. A Dragon Lasers (532GLM300) 532 nm, 300 mW laser was used for excitation and Keiser Optical Systems 1.0 in. Holographic SuperNotch-Plus Notch Filter with a central wavelength of 532.0 nm and a bandwidth of approximately 100 wavenumbers was used to subtract out residual laser light.

Example 11

XRD: X-Ray Diffraction spectra were collected using a Seimens D500 X-Ray Diffractometer equipped with a copper tube and a graphite monochromater. The spectra were measured from 2λ from 20° to 80° with a 0.04° step size and a dwell time of 6 secs at each step.

Example 12

SEM: SEM images were obtained using a JEOL 7000 Field Emission SEM instrument. An Oxford Instrument INCAx-sight EDX spectrometer attached to the SEM was used to obtain EDX spectrograms.

Example 12

TABLE 3

Dye degradation results for all samples. Values are in mg of dye per g of microparticles

| Sample | Absorption + Degradation (mg) | Absorption (mg) | Degradation (mg) |
|---|---|---|---|
| Anatase $TiO_2$ | 4.605 ± 0.0613 | — | 4.605 ± 0.0614 |
| 10% Composite, least porous | 6.588 ± 1.20 | 0.9861 ± 0.311 | 5.602 ± 1.41 |
| 10% Composite, porous | 6.447 ± 0.545 | 1.265 ± 0.143 | 5.182 ± 0.679 |
| 20% Composite, least porous | 7.262 ± 0.798 | 0.8882 ± 0.0338 | 6.373 ± 0.800 |
| 20% Composite, porous | 6.163 ± 1.60 | 1.397 ± 0.269 | 4.766 ± 1.86 |

TABLE 3-continued

Dye degradation results for all samples. Values are in mg of dye per g of microparticles

| Sample | Absorption + Degradation (mg) | Absorption (mg) | Degradation (mg) |
| --- | --- | --- | --- |
| 20% Composite, most porous | 6.766 ± 0.429 | 1.209 ± 0.0929 | 5.557 ± 0.339 |
| 10% in situ, least porous | 3.542 ± 0.0613 | 1.260 ± 0.0339 | 2.282 ± 0.0953 |
| 10% in situ, porous | 3.507 ± 0.106 | 1.358 ± 0.0897 | 2.149 ± 0.160 |
| 10% in situ, most porous | 2.550 ± 0.487 | 1.906 ± 0.0897 | 0.6445 ± 0.420 |
| 20% in situ, porous | 3.400 ± 5.19 × 10 | 1.456 ± 0.235 | 1.945 ± 0.235 |
| 20% in situ, most porous | 1.877 ± 0.342 | 1.632 ± 0.0587 | 0.4003 ± 0.0845 |
| 10% in situ, most porous, 15 min sol-gel | 3.684 ± 0.0613 | 1.655 ± 0.207 | 2.029 ± 0.264 |
| 10% in situ, most porous, 30 min sol-gel | 2.550 ± 0.487 | 0.7512 ± 0.212 | 1.657 ± 0.552 |
| 10% in situ, most porous, 45 min sol-gel | 2.054 ± 0.162 | 0.7317 ± 0.122 | 1.323 ± 0.0895 |
| 10% in situ, most porous, 60 min sol-gel | 1.594 ± 0.213 | 0.7121 ± 0.244 | 0.8819 ± 0.0714 |
| 20% in situ, most porous, 15 min sol-gel | 3.507 ± 0.213 | 1.475 ± 0.0339 | 2.031 ± 0.215 |
| 20% in situ, most porous, 30 min sol-gel | 2.515 ± 0.342 | 1.465 ± 0.122 | 1.050 ± 0.401 |
| 20% in situ, most porous, 45 min sol-gel | 1.877 ± 0.585 | 1.456 ± 0.269 | 0.6368 ± 0.215 |
| 20% in situ, most porous, 60 min sol-gel | 1.240 ± 0.221 | 1.319 ± 0.148 | 0.2555 ± 0.125 |

The invention claimed is:

1. A hybrid non-hollow non-calcined microparticle comprising photocatalytically active anatase titanium dioxide nanoparticles generated by methanol mineralization at a temperature less than 60° C. embedded within a polylactide matrix, wherein the polylactide matrix is a porous sponge.

2. The hybrid microparticle of claim 1, wherein the polylactide is a poly-(D,L-lactic acid) or a poly-(lactic-co-glycolic acid).

3. The hybrid microparticle of claim 1, wherein the titanium dioxide is embedded in a polymer comprising poly-(D,L-lactic acid).

4. The hybrid microparticle of claim 1, wherein the titanium dioxide comprises anatase titanium dioxide nanoparticles coated in a polymer comprising poly-(D,L-lactic acid).

5. The hybrid microparticle of claim 1, wherein the hybrid microparticle has at least one dimension in the range of about 50 μm to about 400 μm.

6. The hybrid microparticle of claim 1, wherein the hybrid microparticle has at least one dimension in the range of about 100 μm to about 300 μm.

7. The hybrid microparticle of claim 1, wherein the microparticle is degradable on prolonged irradiation by light energy.

8. A method of photocatalytically degrading an organic compound in an aqueous liquid comprising:
(i) adding hybrid microparticles according to claim 1 to an aqueous liquid having an organic compound desired to be degraded; and
(ii) irradiating the hybrid microparticles with light energy, thereby photocatalytically degrading the organic compound in contact with the titanium dioxide of the hybrid microparticles.

9. The method of claim 8, wherein the organic compound is a hydrocarbon, a biomolecule, an industrial waste product, or an agricultural waste product.

* * * * *

UNITED STATES PATENT AND TRADEMARK OFFICE
CERTIFICATE OF CORRECTION

PATENT NO. : 9,764,316 B2
APPLICATION NO. : 14/125371
DATED : September 19, 2017
INVENTOR(S) : Eugenia P. Kharlamieva et al.

It is certified that error appears in the above-identified patent and that said Letters Patent is hereby corrected as shown below:

In the Specification

At Column 1, Line 15, please insert the following paragraph before "TECHNICAL FIELD":
-- STATEMENT OF GOVERNMENT SUPPORT
This invention was made with government support under grant number EB011319 awarded by the National Institutes of Health. The government has certain rights in the invention. --

Signed and Sealed this
Twenty-fourth Day of March, 2020

Andrei Iancu
*Director of the United States Patent and Trademark Office*